(12) United States Patent
Legrand et al.

(10) Patent No.: US 8,510,467 B2
(45) Date of Patent: Aug. 13, 2013

(54) MONITORING A MESSAGE ASSOCIATED WITH AN ACTION

(75) Inventors: Veronique Legrand, Rillieux (FR); David Maciejak, Villeurbanne (FR); Jacques Saraydaryan, Villeurbanne (FR); Laurent Pautet, Rillieux (FR); Christophe Briguet, Paris (FR); Fatiha Benali, Villeurbanne (FR)

(73) Assignee: EPT Innovation, Villeurbanne (FR)

( * ) Notice: Subject to any disclaimer, the term of this patent is extended or adjusted under 35 U.S.C. 154(b) by 0 days.

(21) Appl. No.: 12/522,907

(22) PCT Filed: Jan. 11, 2008

(86) PCT No.: PCT/EP2008/050303
§ 371 (c)(1),
(2), (4) Date: May 7, 2010

(87) PCT Pub. No.: WO2008/084104
PCT Pub. Date: Jul. 17, 2008

(65) Prior Publication Data
US 2010/0274892 A1    Oct. 28, 2010

(30) Foreign Application Priority Data

Jan. 11, 2007 (FR) .................................... 07 00203
Jun. 22, 2007 (FR) .................................... 07 55958

(51) Int. Cl.
*G06F 15/173* (2006.01)
(52) U.S. Cl.
USPC ........... 709/238; 709/201; 709/203; 709/226
(58) Field of Classification Search
USPC .................................. 709/201, 203, 226, 238
See application file for complete search history.

(56) References Cited

U.S. PATENT DOCUMENTS

| 7,219,148 B2 * | 5/2007 | Rounthwaite et al. ......... 709/224 |
| 7,231,403 B1 * | 6/2007 | Howitt et al. .......................... 1/1 |
| 7,376,969 B1 * | 5/2008 | Njemanze et al. .............. 726/22 |
| 7,730,063 B2 * | 6/2010 | Eder .............................. 707/736 |
| 2003/0023712 A1 * | 1/2003 | Zhao et al. ..................... 709/223 |
| 2005/0209876 A1 | 9/2005 | Kennis et al. |
| 2005/0251570 A1 * | 11/2005 | Heasman et al. ............. 709/224 |
| 2006/0036670 A1 * | 2/2006 | Musman ....................... 709/202 |
| 2007/0179987 A1 * | 8/2007 | Lim ............................... 707/200 |
| 2007/0283002 A1 * | 12/2007 | Bornhoevd et al. ........... 709/224 |

OTHER PUBLICATIONS

Maamar, et al., "Towards an Ontology-Based Approach for Specifying and Securing Web Services," *Information and Software Technology 48*, Jul. 2006, pp. 441-455.
Ocampo, et al., "Towards Context-Based Flow Classification," *IEEE Conference on Autonomic and Autonomous Systems*, Jul. 2006, 10 pages.

* cited by examiner

*Primary Examiner* — Phuoc Nguyen
(74) *Attorney, Agent, or Firm* — Fish & Richardson P.C.

(57) ABSTRACT

The invention relates to a method for monitoring at least one message, each message being associated with an action generated by at least one element or user of an information system (1000), said message(s) being collected by at least one message collecting device of the IS. According to the invention, the method comprises the step of defining a plurality of reference event categories each associated with at least one reference action from an ontology based on an intention class that characterizes the purpose of each reference action, an activity type class that qualifies the nature of each reference action, a movement class that characterizes the means for implementing each reference action, a target class that characterizes the object of each reference action, and a gain class that characterizes the result of each reference action.

19 Claims, 11 Drawing Sheets

| OBJECTIF | ACTIVITY | | TARGET TYPE | TARGET DETAIL | RESULT |
|---|---|---|---|---|---|
| Authentication | Activity | Add | UPS | Account | Denied |
| Authentication | Attack | Backdoor | Application | AccountGroup | Detected |
| Authentication | Config | Backup | ApplicationPayment | AccountHost | Error |
| Authentication | Information | Bounce | ARP | AccountService | Exceeded |
| Authentication | Malware | BruteForce | Audit | Address | Expired |
| Authentication | Suspicious | Bypass | Chat | Admin | Falleo |
| Authentication | Vulnerability | Concealment | Cluster | AdminGroup | High |
| Rights | Activity | Connection | Command | Anonymous | Invalid |
| Rights | Attack | Control | ConfFile | Attach | Low |
| Rights | Config | DDoS | Data | Battery | Normal |
| Rights | Information | Delete | Database | Cache | Notify |
| Rights | Suspicious | DirectoryTraversal | DHCP | Certificate | Success |
| Rights | Vulnerability | Disconnection | DNS | Client | Valid |
| System | Activity | DoS | Domain | Cluster | |
| System | Attack | Down | ESMA | Command | |
| System | Information | Evasion | Ethernet | ConfFile | |
| System | Malware | Execute | Finger | CPU | |
| System | Suspicious | Forward | Firewall | Credential | |
| System | Vulnerability | Gain | FTP | Data | |
| | | Hijacking | GUI | Directory | |
| | | InformationGathering | HA | Disk | |
| | | InformationLeak | Host | File | |
| | | Injection | ICMP | Format | |
| | | Locked | IDS | Guest | |
| | | Modify | IP | GUI | |
| | | Other | IPSec | Image | |
| | | Overflow | LDAP | Integrity | |
| | | P2P | Mail | Interface | |

Fig. 5A

| OBJECTIF | ACTIVITY | TARGET TYPE | TARGET DETAIL | RESULT |
|---|---|---|---|---|
| | Phishing<br>Physical<br>Poisoning<br>Protocol<br>PuP<br>Read<br>Receive<br>Repair<br>Restarted<br>Restore<br>Send<br>Session<br>Spam<br>Spoofing<br>Spyware<br>Started<br>Steal<br>Stopped<br>Threshold<br>Trojan<br>Uninck<br>Up<br>Update<br>Violation<br>Virus<br>Worm<br>Write | Management<br>Modem<br>Multimedia<br>NFS<br>OS<br>P2P<br>PKI<br>Port<br>PrinterDevice<br>PrinterProtocol<br>Protocol<br>Proxy<br>RIP<br>Router<br>RPG<br>SecurityTools<br>Service<br>SSH<br>SSL<br>Switch<br>SysAuth<br>SysCrypt<br>SysData<br>TCP<br>Telnet<br>Time<br>Traffic<br>UDP<br>UpdateService<br>URI<br>VLAN<br>VPN<br>Web<br>Wireless | License<br>LogFile<br>Memory<br>Message<br>Method<br>Modem<br>Name<br>Packet<br>Parameter<br>Password<br>Patch<br>Path<br>Pattern<br>ACL<br>Power<br>Process<br>Queue<br>Registry<br>Reply<br>Request<br>ServiceGroup<br>State<br>SysData<br>SysDirectory<br>SysFile<br>Table<br>Temperature<br>Timeout<br>Traffic<br>Trap<br>Tunnel<br>URL<br>Version | |

Fig. 5B

MONITORING A MESSAGE ASSOCIATED WITH AN ACTION

FIELD OF THE INVENTION

The invention relates to the field of information systems (hereinafter referred to as IS).

The invention can be applied particularly, but not exclusively, to IS monitoring and used in particular to detect intrusions and/or generate activity reports.

PRIOR ART

The monitoring tools used in IS intrusion detection field have sought in recent years to deploy security or monitoring systems otherwise known as information sources.

Information sources are numerous and varied, and might be presence detector probes, or video cameras or temperature sensors, etc. A distinction may be made between information source categories that act as audit tools returning messages of all kinds to audit logs and more specialised information source categories such as intrusion detector probes used for the detection of known attacks (signatures).

The information sources return specific messages, for example a network audit source detects messages about network behaviour and cannot detect intrusive behaviour. In the example below, an example is given to express the diversity of the languages (referred to as heterogeneous languages) used by different information sources of an IS. First and second messages are shown (referred to as a and b) delivered by two different information sources and expressing a single administrator login.

a) first message collected in the SYSLOG audit log from an information source auditing a Linux operating system:

"Authentication succeeded"

b) second message collected in the audit log from a Netscreen information source:

"user login"

The information source monitors actions. The actions it observes are taken by agents who may be human beings (users, administrators or attackers) or IS processes.

An information source operates as a filter. It intercepts, collects and analyses a flow in the form of a datum which it compares with a value it has previously learnt. These known values are signatures for an intrusion detector probe or metrics or thresholds for a network, application or system probe. It operates under the principle of sending a message (or raw event or raw log) to notify the analyst of the results of its analysis. For example a network probe will alert the network analyst that 63% of the passband is in use which exceeds the learned threshold of 60%.

The security analyst is responsible for monitoring the different assets of the IS. He uses his expert knowledge to interpret messages coming directly from the information sources. He uses the meaning of the message to recognise, interpret, compare or consolidate a plurality of messages. The accuracy of the message has a strong influence on the effectiveness of the countermeasure taken by the analyst.

The message provides the analyst with indications for applying the countermeasure appropriate to the problem detected by the monitoring source. A message describes the actions observed in the IS with a phrase or expression in pseudo-natural language. The semantics is all the key elements of the phrase or expression which will be recognised by the analyst in interpreting and processing the message. The message and semantics thereof are specific to the information sources and give only a partial observation on what has happened.

The monitoring system on the other hand gives the overall view. It consolidates all these specific messages by networking the information sources which transmit their messages to a centralised database. It takes account of messages from other systems and network supervision equipment (associated with IS activity supervision messages) or from applications (associated with application supervision messages) which give basic indications for detecting an intrusion or for reconstituting what has happened. For about a hundred information source models, consolidation gives a volume of different messages to be analyzed of more than 30,000. In companies, the total number of messages collected per day is between 1 GB and 100 GB on average. The rate at which messages are fed into the database may reach several thousands of 1,000 messages per second.

As seen previously the corpus of raw messages from the monitoring system contains huge quantities of heterogeneous messages. The purpose of standardisation is to structure said messages: to do this, it converts the message into a structured expression known as a standardised event. Standardisation uses the same principle as a translator relying on a classification, ontology or taxonomy. The purpose of a classification system is to facilitate the consolidation of messages with common characters. A taxonomy is a straightforward classification of classes described as an extension (with lists of terms) and an ontology is a classification by meaning which provides a message semantics that can be used by automata. Each source observing an action sends a natural message converted into a standardised event.

To convert a natural phrase into a structured phrase, the security expert establishes linguistic, lexical, syntactic or semantic rules that are used by the standardisation process. Lexical rules define a set of terms, semantic rules define the meaning of the words in their context and syntactic rules define the organisation of the terms in the phrase.

However, three faults may occur while converting via the standardisation process among redundancies and omissions.

1) When a plurality of sources observes one and the same action, they each send their own message. As seen previously, the function of standardisation is to convert each of these messages into a standardised event; when this happens, a plurality of standardised events will be obtained even though they represent the same action (redundancy).

2) When a plurality of experts send standardisation rules for a given message, they must generate the same rules and the same terms, and the experts must therefore be in agreement so that one and the same message sent on a plurality of occasions always generates the same standardised event; if this does not happen, these messages which are similar in meaning will be standardised with different terms (redundancy through lack of consensus). For example, "house" and "residence" represent the same concept of "habitation", and can be standardised as "habitation". Often, "term by term" translation does not define the concept notion and promotes deviations by creating a concept for each term.

3) conversely, each message has to find a concept or term that corresponds to it: this is known as completeness. If through a lack of completeness some standardisation rules are not present, the messages will not be translated and will not be returned to the analyst. Where a new term is present, if the concept is not present, new rules will have to be established.

To sum up, standardisation systems must be consensual and comprehensive through classification or codification mechanisms.

Software manufacturers or publishers in the security information management systems (SIM) market face up to source heterogeneity by specifying ad hoc standardisation which performs a simple "term by term" translation. This principle guarantees to the analyst that each message whereof the terms are known in advance will be returned but does not verify that the translated action has already been codified (redundancy).

To guide the expert setting up the standardisation rules, he is provided with a preset table, obtained by using a classification that may be a taxonomy or an ontology so that a message can easily be associated with a standardised event. Said classifications specific to each SIM or IDS publisher are arranged in attack taxonomies, attack description languages and attack ontologies. The result is a standardisation in the form of attack signatures for security systems (IDS or Intrusion Detection System) restricted to intrusion detection data processing. The document "Modeling computer attacks: An ontology for intrusion detections" published in 2003 in LNCS-2516, editor, "The Sixth International Symposium on Recent Advances in Intrusion Detection", proposes an ontology for describing attacks.

In conclusion, the current art focuses on correlation and aggregation, and problems with establishing attack scenarios are a stumbling block for most current IS monitoring tools; on the other hand no solution resolves the problem of message heterogeneity related to the networking of different information sources. Likewise the work of SIM publishers has not broadened standardisation to cover information other than security information. In fact the effectiveness of aggregation and correlation processes is closely related to message standardisation, if only by undeniably reducing the number of messages from centralisation or by reducing the complexity generated by the diversity and redundancies thereof and hence limiting the processes applied by a human being: standardisation processes must improve these two aspects.

OBJECTIVES OF THE INVENTION

The objective of the invention is to overcome the drawbacks of the prior art.

To be more precise, one objective of the invention, in at least one of its embodiments, is to provide a technique for handling messages obtained by at least one IS information source based on message standardisation, said standardisation taking account not only of security messages but also of all messages related to monitored activities of the IS, whether at system level or at application level.

Another objective of the invention, in at least one of its embodiments, is to provide a technique of this kind that does not compel the security analyst to know the language of each information source.

Another objective of the invention, in at least one of its embodiments, is to provide a technique of this kind whereof the ontology-based standardisation reflects reality and means that the information sources can be disregarded.

A further objective of the invention, in at least one of its embodiments, is to provide a technique of this kind that is straightforward to implement and inexpensive.

DISCLOSURE OF THE INVENTION

These objectives, and others which will become clear subsequently, are met by using a method for monitoring at least one message, each message being associated with an action generated by at least one element or the user of an information system (IS), said message or messages being collected by at least one message collecting device of the IS.

According to the invention the method comprises the following steps:

defining a plurality of reference event categories, each associated with at least one reference action from an ontology based on an intention class that characterises the purpose of each reference action, an activity type class which qualifies the nature of each reference action, a movement class that characterises the means for implementing each reference action, a target class that characterises the object of each reference action and a gain class that characterises the result of each reference action;

and for each given message, disassembling said given message in a database formed by the intention class, the activity type class, the movement class, the target class and the gain class;

comparing the disassembled message with at least one reference event category;

generating at least one standardised event representing a correspondence between the disassembled message and the reference event category.

The general principle of the invention comprises standardising collected messages by comparing them with previously disassembled messages in a table formed by classes of categories from an ontology based on action theory.

Said method can thus be used to reduce the quantity of messages collected but also to make them more intelligible and relevant. In a more overall sense, the processes carried out under the method allow filtering, aggregation or correlation operations to be performed. There are no correlation mechanisms in existence today that process said standardised event categories.

A technique is thus obtained for processing messages obtained by at least one IS information source based on message standardisation, said standardisation taking account not only of security messages but also of all messages related to monitored actions of the IS and in particular: application, network system, hardware, normal, abnormal, suspicious actions.

Furthermore, this standardisation which reflects reality does not compel the analyst to know the language of each information source by disregarding the information sources.

A message standardisation is thus obtained that guides the classification process, that covers all monitored actions of the IS and that removes ambiguity for classifying a message, a standardisation with a semantics that can be implanted in an application so that the application is able to employ reasoning.

Once standardised, the messages are fed into the correlation engine in order to reconstitute what has happened but also to generate reports and statistics. The message standardisation method operates automatically and must be able to reason about said data.

Preferentially, if the disassembled message corresponds to a reference event category, then the method comprises the following steps:

verifying that the reference event category is not already present in a first storage means:

in the event of a positive verification, storing said reference event category in said first storage means.

To advantage, if the disassembled message corresponds to none of said reference event categories, then the method comprises the following step:

storing the message in a second storage means.

According to one advantageous inventive feature, during the step of defining a plurality of reference event categories, at least one of said reference event categories is defined from at least one other of said reference event categories and from at least one rule belonging to the group comprising:
- syntactic rules;
- lexical rules;
- semantic rules.

Preferentially, for at least one of said reference event categories, it comprises a step of counting a number of disassembled message(s) which correspond to said reference event category.

To advantage, said intention class comprises the following intentions:
- intentions of discovering and/or collecting at least one datum about at least one IS target;
- intentions of accessing the IS by means of at least one authentication procedure that implements at least one identification datum;
- intentions of accessing at least one IS resource by means of at least one rights-requiring procedure;
- intentions of accessing at least one availability of at least one IS resource.

According to one advantageous inventive feature, said movement class comprises the following movements:
- movements related to at least one action that does not affect the IS configuration
- movements related to at least one action that does affect the IS configuration;
- movements related to at least one attack;
- movements related to at least one piece of malicious software developed for the purpose of harming the IS;
- movements related to at least one suspect action detected by at least one action detector probe of the IS;
- movements related to at least one vulnerability of the IS;
- movements reflecting an observed state of the IS.

According to one advantageous inventive embodiment, said gain class comprises:
- for intentions corresponding to movements related to at least one action that does not affect the IS configuration and to movements related to at least one action that does affect the IS configuration:
- successes;
- failures;
- denials;
- errors;
- for intentions corresponding to movements related to at least one attack, to movements related to at least one piece of malicious software developed for the purpose of harming the IS, to movements related to at least one vulnerability of the IS and to movements related to at least one suspect action detected by at least one action detector probe of the IS:
- detections;
- for intentions corresponding to movements reflecting an observed state of the IS:
- gains from intentions corresponding to at least one movement reflecting at least one action of at least one target of the IS;
- gains from intentions corresponding to at least one movement reflecting at least one use of at least one threshold on at least one target of the IS.

To advantage, gains from intentions corresponding to movements reflecting actions of the targets of the IS comprise:
- valid states subsequent to at least one control;
- invalid states subsequent to at least one control;
- notifications about at least one target subsequent to at least one control.

Preferentially, gains from intentions corresponding to movements reflecting uses of thresholds in respect of targets of the IS:
- exceeding at least one time-related threshold;
- exceeding at least one threshold unrelated to time;
- low use of at least one threshold;
- normal use of at least one threshold;
- high use of at least one threshold.

The invention also relates to a computer software product, that can be downloaded from a communications network and/or recorded on a medium that can be read by a computer and/or run by a processor, characterised in that it comprises program code instructions for implementing the monitoring method as previously described.

The invention also relates to a storage means, possibly totally or partially removable, that can be read by computer, storing a set of instructions that can be run by said computer in order to implement the monitoring method as previously described.

The invention also relates to a device for monitoring at least one message, each message being associated with an action generated by at least one element or the user of an information system (IS), said message or messages being collected by at least one message collecting device of the IS.

According to the invention, the device comprises:
- means for defining a plurality of reference event categories each associated with at least one reference action from an ontology based on an intention class that characterises the purpose of each reference action, an activity type class that qualifies the nature of each reference action, a movement class that characterises the means for implementing each reference action, a target class that characterises the object of each reference action and a gain class that characterises the result of each reference action;

and for each given message:
- means for disassembling the given message in a database formed by the intention class, the activity type class, the movement class, the target class and the gain class;
- means for comparing the disassembled message with at least one reference event category;
- means for generating at least one standardised event representing a correspondence between the disassembled message and the reference event category.

LIST OF FIGURES

Other inventive features and advantages will become clearer from reading the following description of a plurality of preferential embodiments given as straightforward illustrative and non-restrictive examples, and from the appended drawings, among which:

FIGS. 5A and 5B show possible lexical values of each of the concepts (Objective, Activity-Type, Movement, Target Type, Target Detail and Result) according to the particular inventive embodiment;

DESCRIPTION OF ONE INVENTIVE EMBODIMENT

Figure 1:
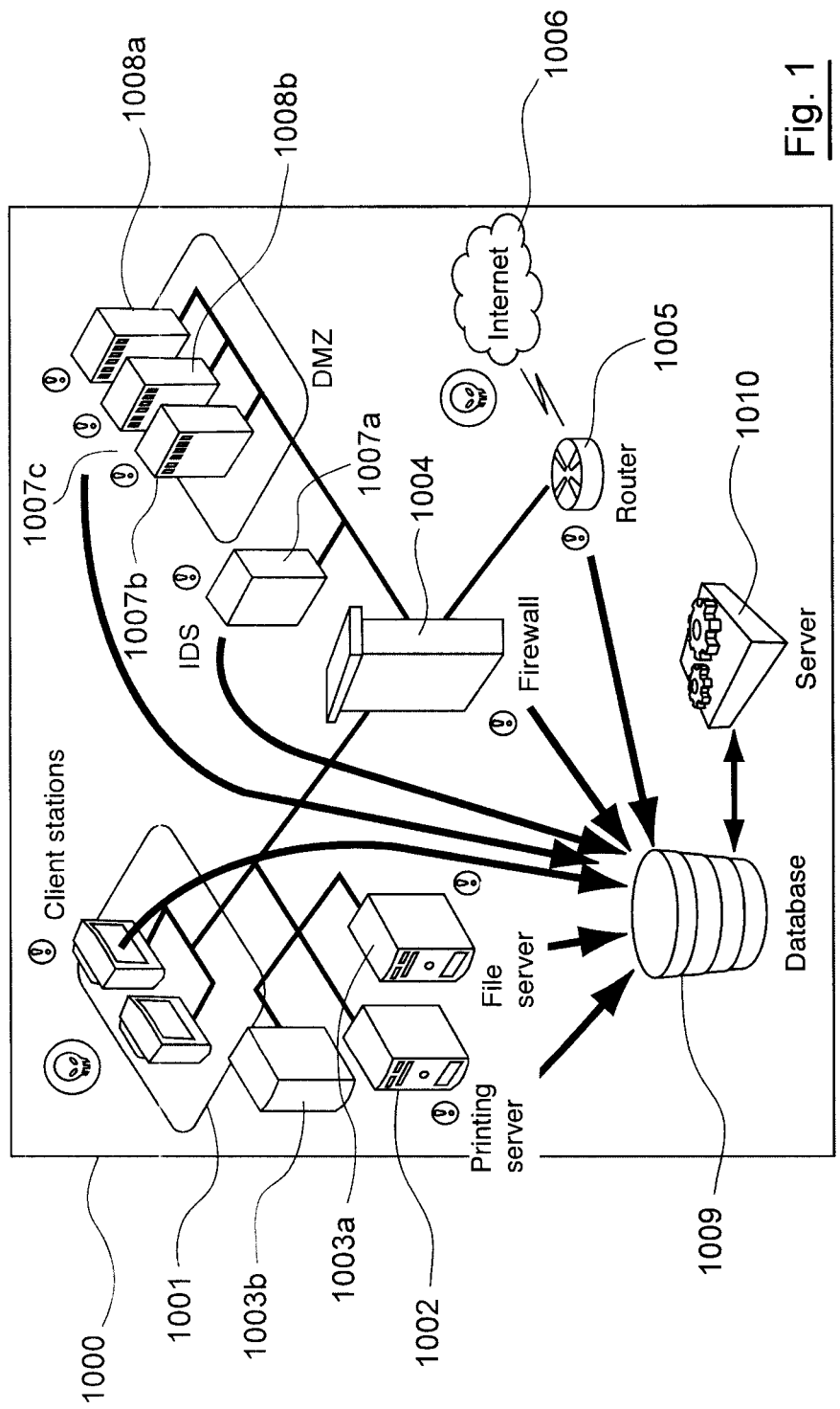
FIG. 1 shows a diagram of an IS according to a particular inventive embodiment.

There follows hereinafter a description of a method for monitoring at least one message, each message being associated with an action generated by at least one element or the user of an IS 1000 (as described in relation to FIG. 1), said message or messages being collected by at least one message collecting device of the IS according to a particular embodiment of the invention. The messages sent by the information sources, once converted under the conversion method (comprising the aforementioned disassembling, comparing and generating steps) are known as standardised events.

The IS 1000 comprises at least one network hosting entities provided with at least one information source (workstation 1001, printing server 1002, file server 1003a, application server 1003b) connected to the Internet 1006 through a router 1005 and a demilitarised zone (DMZ) for controlling all incoming and outgoing flows. The DMZ employs security information sources, namely 1) at least one filtering system, such as a Firewall 1004 for filtering the flows, or 2) at least one intrusion detection system (network 1007a, system 1007b and application 1007c) or 3) at least one set of gateways dedicated to anti-virus operations 1008a and 1008b such as WEB, SMTP and DNS gateways for example.

All the previously mentioned information sources of the IS have access to a database 1009 managed by the monitoring method server 1010. The IS 1000 is thus able to network all types of information sources whether at system level or at application level.

Clearly, the invention applies to all types of information systems such as computer networks or even surveillance systems at locations like museums, industrial sites, etc.

The inventive monitoring method employs a standardisation mechanism to collect, structure and consolidate messages of the same type returned by the aforementioned information sources. The security analyst has a view of all actions in progress and receives for each of them one standardised event and one only. This view is mandatory for anticipating and reacting to an incident or attack in progress.

The standardisation method in terms of the present invention codifies standardised events using a semantics so that they are structured and comprehensible to all automated mechanisms for the purpose of processing or handling a large amount of messages.

The standardisation method comprises a step of modelling (which comprises a step of defining ontology concepts in order to express the message semantics—intention, activity-type, movement, target, result—and a step of linguistic definition in order to define the terms and syntaxes of each of said concepts) and of conversion (comprising disassembling, comparing and generating steps as mentioned above)

Modelling by defining a plurality of reference event categories each associated with at least one reference action from an ontology based on an intention (or objective) class that characterises the purpose of each reference action, an activity class that qualifies the nature of the intention, a movement class that characterises the means for implementing each reference action, a target class that characterises the object of each reference action and a gain (or result) class that characterises the result of each reference action;

and for each given message,

Disassembling said given message in a database formed by the intention class, the activity class, the movement class, the target class and the gain class;

Comparing the disassembled message with at least one reference event category;

Generating at least one standardised event representing a correspondence between the disassembled message and the reference event category.

The modelling (which comprises the aforementioned definition step) according to the particular inventive embodiment provides the structure and the semantics for standardising a message as a standardised event that can be understood by an automaton or any security analyst. The security expert performs this step using a standardisation assistance tool.

Conversion in accordance with the invention (comprising disassembling, comparing and generating steps as mentioned above) is performed by a security expert who defines the rules for converting a message into a standardised event using linguistic tools from artificial intelligence to fully assist his expert work. Expert knowledge may at this stage be indispensable for contributing to or completing the conversion rules.

In the context of the present inventive embodiment, all the messages used for classifying security information are collected by SMS software marketed under the reference ExaProtect SMP-300, SMP-500, SMP-1200 and SMA-50 produced and published by the company EPT. There are a great number of commercially available formats that can be used to structure standardised events (IDMEF, CIM, IODEF, SNMP etc). The security event standardisation proposed through the IDMEF (Intrusion Detection Message Exchange Format) by the IDWEG (Intrusion Detection Working Group) to the IETP (Internet Engineering Task Force) has currently been selected as the basis for structuring standardised messages via ExaProtect software.

Introduction to Standardisation According to the Particular Inventive Embodiment A description will now be given of the standardisation process according to the particular inventive embodiment. The standardisation comprises the aforementioned modelling and conversion process.

Monitoring systems collect and centralise information in a message database known as a raw corpus. This consists of heterogeneous, unclassified and unstructured messages with specific semantics depending on the function of the source: some messages describe the same action but with expressions or terms specific to each source (redundancy, relevance), others describe the same action but observed at different stages: action start or end etc (particle size analysis: aggregation and correlation).

The human being, the security analyst who analyses message by message, cannot know the totality of these messages and is unable to distinguish the relevant messages; he must be helped by automated mechanisms.

There is no universal format in existence for heterogeneous data or any standard for standardising overall message semantics. Automata are not operational on unstructured data without semantics. Messages do however require a standardisation system. Standardisation defines a structure for messages so that correlation and aggregation automata are able to operate and a semantics for recognising and consolidating messages representing the same actions.

Standardisation defines a semantics and a structure associated with each message such that 1) each message has a relevant codification that can be understood by an automaton, 2) there is at least one codification per message present (completeness) otherwise a false negative is created, 3) there is at most one codification per same meaning message (consensus) whatever message translation process is used.

Standardisation defines a codification of all real actions in the form of a set of reference event categories. Standardisation translates the message with the codification of the action it represents; in this way there is only one possible translation per message: the action it represents. The main focus of the invention is to pre-define all relevant real actions (codification) and the conversion rules in order to guide the expert or automata when messages are standardised.

The objective of the modelling phase is to define all reference event categories representing real actions (codification) which are of interest to the monitoring system. As there is only one reference event category per action, the advantage is that there will be only one single standardised event for each message of this action. The message is no longer associated with a structure built from the message but with a pre-defined unique action code. The function of modelling in accordance with the particular inventive embodiment is to identify and define all reference actions; said step is key and is carried out using an ontology for building the semantics of each message and consolidating those with the same meaning (or raw logs) via said semantics.

Standardisation comprises a modelling phase based on an ontology, consisting of concepts retrieved from action theory and from rules laid down according to the profile classes present in the IS.

Modelling According to the Particular Inventive Embodiment

Modelling meets the aforementioned requirements for completeness and consensus.

Ontology defines all actions by meaning, in other words it defines concepts and linguistic rules such that the conversion process is able to associate only one reference event category to a given message. Ontology is designed such that all significant IS security-related actions are present in the form of a reference event category and that all actions have an unambiguous linguistic definition so that there cannot be two standardised event categories that express the same action.

Ontology Concepts According to the Particular Inventive Embodiment

It is not easy to find a common and unambiguous modelling for all actions. Five concepts have been retrieved from Davidson's stated principles on the theory of action: 1) intention, 2) activity, 3) movement, 4) target and 5) result, subsequently consolidated by expert knowledge and analysis of the real raw corpus.

Davidson, in his philosophical work "Actions, Reasons, and Causes", "Journal of Philosophy pp 685-700 (Reprinted in Davidson 1980, pp 3-19.), 1963", states that knowing the reason for an action amounts to knowing the intention that gave rise to it. Modelling according to the particular inventive embodiment initially adopted two "intention" and "activity type" concepts, the first defining the intention an agent has when he takes a step as part of a plan constructed for an end purpose, and the second evaluating whether said action type is normal, suspect or abnormal by its intention and its conformity with the agent's plan.

The modelling defines a third "movement" concept for specifying the intention and activity type. Several authors (Mele, 1992, Bratman, 1987, Brand, 1984) have stressed that most of our actions involve movements. Israel, Perry and Tutiya (David Israel et al., n.d.) have noted that the explanation for the action is incomplete without introducing the concept of movement present in each action. Without the slightest idea of movement there is nothing to constitute the fact of performing the action.

ExaProtect modelling integrates a fourth concept, the "result". It is difficult to think that there can be an intention of performing an action if no result is expected that brings the agent closer to his final objective. Some actions define a step in the agent's plan (access to a server is one example of a step taken) whereas other actions are descriptive and evaluate the states of the agent's environment (a certificate being required to log in or the certificate being out of date are description examples). The success or failure of each step evaluates the progress of the agent in his plan, and this is the concept of "gain". Conversely the concept of "control" is introduced in order to evaluate the agent's environment but it expresses neither progress nor gain. Control is quantitative (the "threshold" concept) or qualitative (compliant or non-compliant): for example, the certificate is invalid (qualitative) or out of date (quantitative)).

To sum up, the modelling adopts five basic ontological concepts to disassemble an action. These five concepts establish the reference event categories that represent all the actions in the ontology of actions. Said five concepts interact with each other in such a way that there can be just one relation and only one for expressing all real actions of the IS: the generalisation of a reference event category is expressed as:

"A movement M in respect of the target C has a result R for an intention I of Activity type A".

The Language and Rules of Ontology According to the Particular Inventive Embodiment Rule definition reduces the number of actions to be modelled (which is theoretically infinite) while preserving the relevance of each message and covering all the actions that have to be present from the point of view of the monitoring system.

The rules define the ExaProtect language where each concept and each relationship is expressed by common linguistic rules: lexical, syntactic and semantic rules.

The semantic rules: ExaProtect language builds the semantics of each reference event category. The semantics will be transmitted to the message during its conversion into a standardised event: the standardised event inherits said semantics. The semantic rules are transmitted to the security expert and to the standardisation assistance tool so that a choice can be made, when the message is translated into a standardised event, as to the appropriate ExaProtect model. The semantic rules are also transmitted to the analyst or to the automata so they can interpret or reason as to the meaning of the standardised events. Without this knowledge, neither the analyst nor the automata responsible for consolidating the events by their meaning, could operate.

A semantic rule in modelling is defined by a collection of objects which meet common operating rules: for example all the steps in the attacker's plan which define attack behaviour or all the components in the user authentication system or all IS vulnerabilities that define attack routes. Said rules are described later in the document. All ExaProtect models are defined by a semantic rule which generalises the definition of an action according to the 5 concepts mentioned above.

The lexical rules: these define the list of terms and descriptions thereof in ExaProtect language; it is a dictionary; this description expresses each of the 5 intention, activity-type, movement, target and gain concepts with defined terms appropriate to the security field: the list is consensual and validated by experts. The ExaProtect lexicon currently comprises more than 100 natural words. This list is added to as and when and must not create any new reference category that does not comply with the semantic rules. In FIG. 5b we describe a first list used for our conversions.

The syntactic rules: these are straightforward and show up in organising the 5 concepts so that they are separated by the character "_":

---
(Intention_Activity-Type_Movement_Target1_Detail2_Result)
---

Description of the Ontology According to the Particular Inventive Embodiment

A description is now given of the linguistic rules of each of the 5 concepts.

The Intentions of the Agents and the Progress Thereof According to the Particular Inventive Embodiment Some messages express the progress of the agent but this value is difficult to retrieve if no markers are given to detect it. Two markers are required to locate the action relative to the progress of the agent in his plan: 1) knowledge of the steps in the plan in order to locate the action and the step in the plan ("Intention" concept), 2) knowledge of types of agents, of their plan, depending on whether they represent a normal, abnormal, suspicious activity ("Activity-Type" concept).

Semantic Rule for the "Intention" Concept

To attack an IS, an attacker prepares a plan of attack; each stage in the plan corresponds to the fulfillment of an objective. In the same way, an agent, whether attacker or user, advances through a plan: a plan of attack or plan of use. He moves from one objective to another until a final objective is secured. Intentions are stage objectives. The notion of intention is most appropriate since the recognition of intentions allows the plan to be reconstituted and the progress of the agent in the IS to be evaluated.

In ExaProtect modelling progress is defined through access intentions, the other intentions are not detectable. The agent whoever he is, attacker or user, follows a plan in the intention of accessing his target using access mechanisms that correspond to 4 access intentions:

1. The intention to access IS environmental information via information collecting actions. This phase is specific to the attacker, the first attack phase, and includes the identification of target system features. Information collected during this first phase determines vulnerabilities and facilitates the next step in the plan: authentication.

2. The intention to access the IS via authentication actions, disclosing one's identity to the IS validated by authentication mechanisms. This phase is common to all plans and is a pre-requisite for the next step of authorisation.

3. The intention to access IS resources via use of rights actions validated by rights mechanisms. This phase is also common to all plans and constitutes a prior but optional step to accessing the vital functions of the system.

4. The intention to access IS availability via system manipulation actions to execute commands, launch services etc. This is a common step generally taken by an administrator or an attacker. It generally constitutes the final phase of the plan since it has allowed access to the vital functions of the system. It may however constitute only an intermediate step to a more ambitious plan, leading the agent back to previous steps but applied to other targets. We can specify the access intention in the form of a first rule.

Rule 1, Intention: Each use profile shall distinguish 4 intentions, each representing a step in the progression towards a given target and each being differentiated according to whether its purpose is access to information via identification or recognition actions, access to the IS via authentication actions, access to resources via privilege actions and access to vital functions of the system via systems actions.

Syntactic Rule for Intentions

The syntax of the intention concept uses the first field of the Exa model:

---
(Intention_Activity-Type_Movement_Target1_Detail2_Result)
---

Lexical Rule for Intentions

Figure 3:
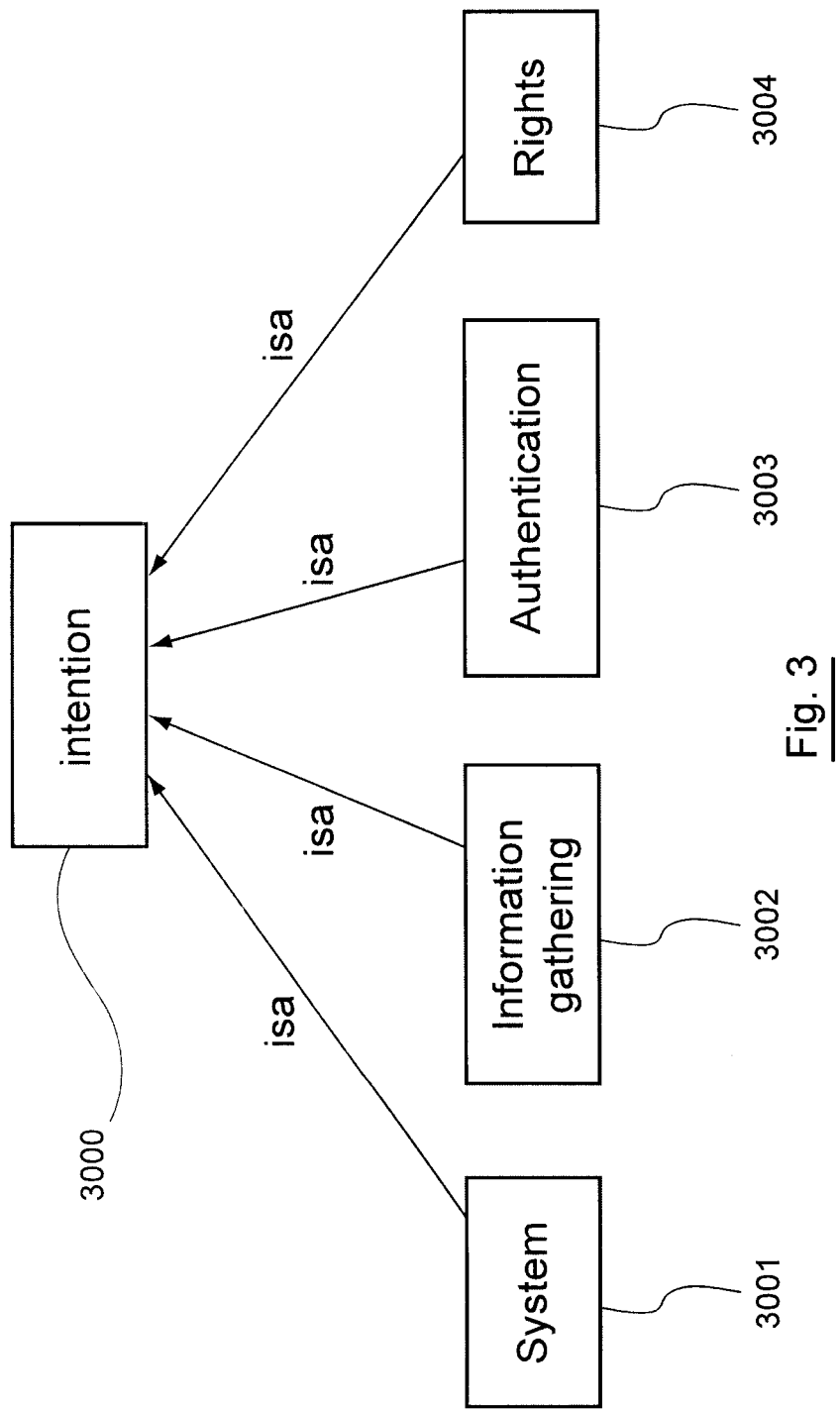
FIG. 3 shows by way of example all intention types, also known as instances or subclasses of the Intention class according to the particular inventive embodiment.

These types of intention 3000 (shown in FIG. 3, correspond to:

1. INFORMATION GATHERING 3002 or RECON: intentions to discover and/or collect at least one contextual datum in respect of at least one by IS target through collection and identification.

2. AUTHENTICATION 3003: intentions to access the IS by means of at least one authentication procedure through the authentication service employing at least one identification datum (an identity with or without knowledge of a secret), (Hereinafter denoted AUTHENTICATION intention 3003). Among the messages classed in the AUTHENTICATION intention, we may cite the successful or failed access to the IS by a user or an error in the authentication service during said access; we may further cite attack intentions using means of the "bruteforce" type to access the IS and messages from vulnerability scanners describing exploitable weaknesses in the authentication system or messages from the information sources describing the system states as an "open network port".

3. RIGHTS 3004: The intentions to access at least one resource of the IS by means of at least one rights-requiring procedure (hereinafter denoted RIGHTS intention 3004). These are messages in respect of which there has been access to a resource via an authorisation or an attempt to access a system resource without said access being authorised by pre-established rules. Among said messages, we may cite movements which allow: access to a file; running or attempting to run an application in a privileged mode, using or attempting to use certain system commands reserved for privileged users, changes to rights of access to sensitive files, attack signatures which have the intention to access resources;

4. SYSTEM 3001: The intentions to access the availability of at least one resource of the IS (hereinafter denoted SYSTEM intention 3001). These are messages in respect of which movements to access the vital functions of the systems, the components or system (SYSTEM) resources thereof, have been used. Among these messages, we may cite movements to run an application or a service or a process, starting, restarting or shutting down an application or a service or a system component or a process, changing the configuration of systems, and the components or applications thereof, sending and receiving packets, files etc., attack signatures which have the intention to access the vital functions of the IS are also classed under this model.

Activity Types According to the Particular Inventive Embodiment

The "Activity-Type" concept is the second marker for evaluating the progress of the attacker.

Semantic Rule for the "Activity-Type" Concept

We have chosen to model the events describing progress in the IS of events that have an informative value. ExaProtect modelling adopts two reference event categories depending on whether they represent progress actions of an agent in the IS or depending on whether they represent the state of the IS or the components thereof.

Rule 2: In all observed (monitored) actions, there are two types of actions: those which describe the environment or "system state" and those which describe "progress" towards a target.

Agents and Activity Type

It is difficult, if not impossible, to be able to differentiate between the actions of an attacker and those of a legitimate user if no attack signature is clearly involved. Once the attacker is inside the system, he is regarded by the system as a legitimate user and the messages will not be able to return any indication of normality or otherwise. Some actions are steps specific to attack or administration plans and others are common to all plans. ExaProtect modelling defines three use profiles that qualify steps as normal, abnormal or suspect:

The "USER" profile represents all normal use actions in the activity of a user which do not modify the configurations of the resources and services of an IS. Said actions undertaken in the IS may be taken by any type of user in order to use the system.

The "ADMINISTRATOR" profile represents all actions of normal operation and maintenance taken by an administrator which modify the configurations of the resources and services of IS as actions. These actions are useful to the administrator who is led to modify all or part of the IS. The administrator advances in the IS also with use actions.

The "ATTACKER" profile represents all so-called "signature" abnormal, "abnormal" and "suspicious" actions. Some messages exhibit no obvious doubt as to their membership of the group of offensive or suspicious actions since they carry "attack" signatures or terms in their content. Abnormal actions are actions to identify, collect information, exploit said information or propagate the attack in the system.

Rule 3: Activity: All observed actions describing progress will be part of the group of actions classed in three use profile categories: attacker, user or administrator.

Rule 3a: An abnormal activity consolidates all suspicious actions, attacks or malware marked by a signature or a keyword indicating their type respectively: attack, suspicious or malware is present.

Rule 3b: A normal activity consolidates all actions taken by a user not making any modifications to the IS or those taken by an administrator making modifications to configurations.

Observations:

In the event of the monitoring system focusing its monitoring on particular users such as a network administrator for example, it is possible to instance each profile so as to relate the monitoring no longer just to the 3 aforementioned profiles but to instances, for example the "network administrator profile" instance for monitoring network actions, and the same for a user of an Oracle database, etc Furthermore, the fact that a "user" or "administrator" profile action is not offensive cannot be deduced; it will merely need to be deduced that it constitutes a legitimate step in a behaviour which may be part of an attack plan or a use plan.

System States

Some messages describe the agent's environment, the system state. These types of messages bring indications to the analyst to show him the concealed presence of an action in progress or conversely to demonstrate that it has been performed. This may involve an exceeded threshold for example such as the abnormal increase in network passband demonstrating a concealed virus attack. It may further involve the discovery of vulnerabilities which confirms to the analyst that an attack has been possible.

In order to express system states, ExaProtect modelling makes a distinction between two notions related to the "activity" type:

1. Vulnerabilities are weaknesses in the IS, or the components thereof, detected by a specific information source known as a "vulnerability scanner"; most of the time, vulnerabilities are conditions for the achievement of an exploit; vulnerabilities represent a subset of system states which have the distinctive feature of being known by these specific tools as being the direct causes of a given exploit: they are signatures; knowledge of vulnerabilities is generally a valuable help in anticipating how far a system is compromised.

2. System states inform the analyst as to the current position of the system he is monitoring: this concerns the other weaknesses that are not known vulnerabilities such as the state of a service, a parameter or a configuration.

Whether vulnerabilities or system states are concerned, said information does not reveal the progress of the agent in respect of an access but returns a state. Knowledge of this state facilitates understanding of what has happened or explains a compromise: it constitutes indications or evidence that is useful to the security analyst.

Linguistic Rule for the "Activity-Type" Concept

We have seen that there are 3 types of values: progress actions, information on system states and actions describing vulnerabilities.

Figure 4:
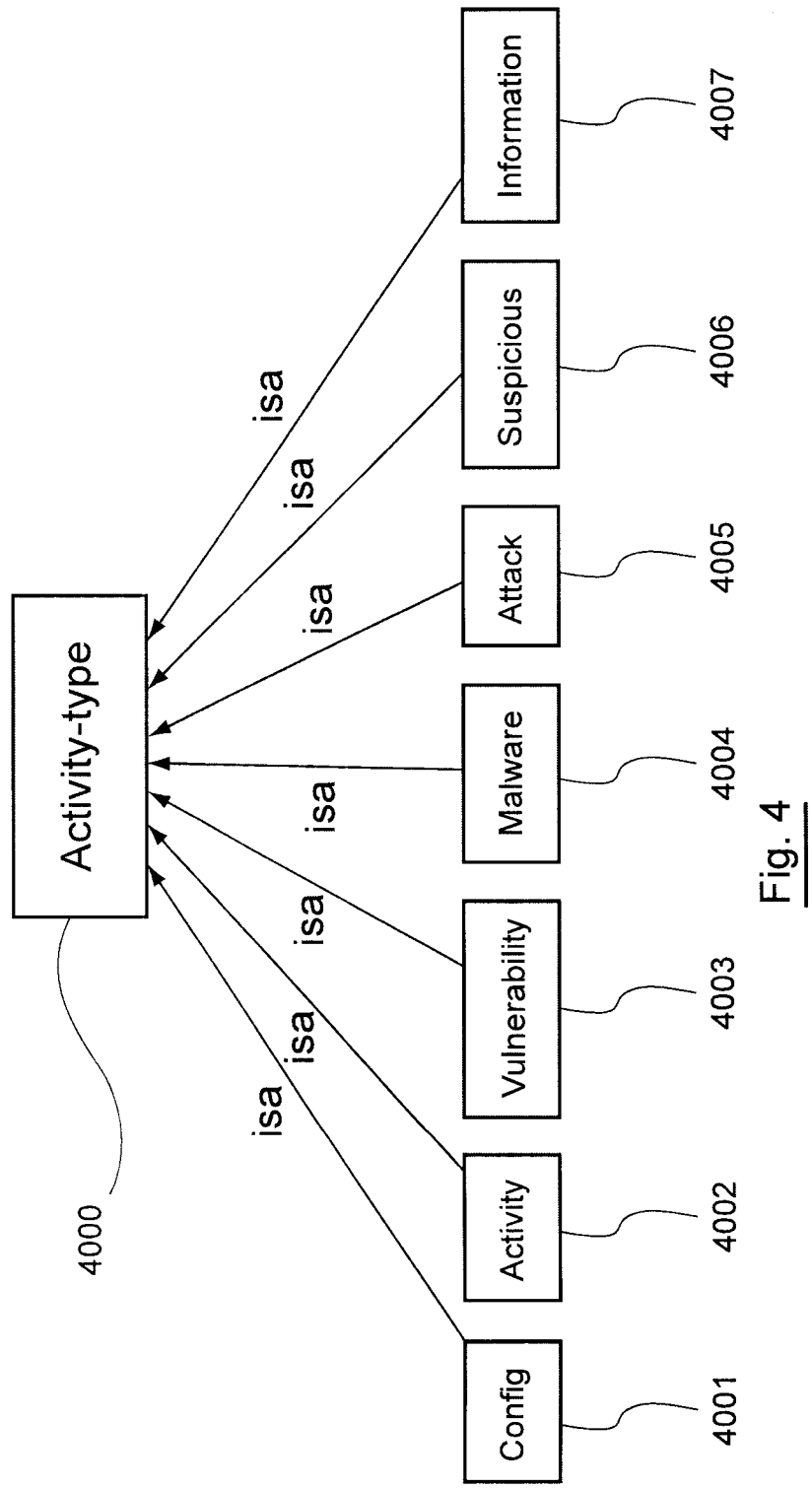
FIG. 4 shows by way of example all activity types, according to the particular inventive embodiment.

FIG. 4 shows by way of example all the activity types, according to the particular inventive embodiment.

Progress Actions

Progress action modelling will be presented in the following form:

(Intention_Activity-Type_Movement_Target1_Detail2_Gain)

1. NORMAL ACTIONS: Messages for describing normal actions according to the present particular inventive embodiment make a distinction between:

1a. "USER" Profile:

USER profiles do not act on the system by operations to modify it; actions taken by USER profiles take the form:

(Intention_Activity_Movement_Target1_Detail2_Gain)

and will be expressed according to the intention by the expression ACTIVITY (referenced as 4002) or by the expression CONFIG (referenced as 4001):

For authentication actions or AUTHENTICATION_ACTIVITY;

For rights related actions or RIGHTS_ACTIVITY;
For system actions or SYSTEM_ACTIVITY;
1b. "ADMINISTRATOR" profile:
ADMINISTRATOR profiles do not act on the system by operations to configure it; actions taken by ADMINISTRATOR profiles take the form
(Intention_Config_Movement_Target1_Detail2_Gain)
and will be expressed depending on the intention:
For authentication actions or AUTHENTICATION_CONFIG;
For rights related actions or RIGHTS_CONFIG;
For system actions or SYSTEM_CONFIG;
2. ABNORMAL ACTIONS
Messages for describing abnormal actions according to the present particular inventive embodiment define an ATTACKER profile and will be expressed in the second field:
2a. Attacks unproven but supposed, represented by the expression SUSPICIOUS (referenced as 4006):

(Intention_Suspicious_Movement_Target1_Detail2_Detected)

2b. Proven attacks represented by the expression ATTACK (referenced as 4005):
(Intention_Attack_Movement_Target1_Detail2_Detected)
2c. Proven nuisances represented by the expression MALWARE (referenced as 4004):
(Intention_Malware_Movement_Target1_Detail2_Detected)
Abnormal actions will be expressed in the first field depending on whether they show an intention:
  of gain authentication gain or AUTHENTICATION_ATTACK;
  of rights gain or RIGHTS_ATTACK;
  of system gain SYSTEM_ATTACK;
Abnormal and suspect actions will be expressed in the first field depending on whether they show an intention:
  of authentication gain or AUTHENTICATION_SUSPICIOUS;
  of rights gain or RIGHTS_SUSPICIOUS;
  of system gain SYSTEM_SUSPICIOUS
Abnormal actions stemming from malicious software will be expressed in the first field depending on whether they show an intention:
  of authentication gain: AUTHENTICATION_MALWARE;
  of rights gain: RIGHTS_MALWARE;
  of system gain: SYSTEM_MALWARE
System States
Messages that set out to describe system states are described in the next paragraph and will be presented in the form:
(Intention_Information_Control_Target1_Detail2_Result)
As explained (and hereinafter referenced as the "INFORMATION" activity 4007), these reference event categories use the same concepts as ExaProtect action models. On the other hand, they are modelled by a generic phrase which will be adapted to the observation of the environment by the agent depending on 1) quantitative or 2) qualitative criteria.
Quantitative:
ExaProtect modelling defines the "threshold" concept for modelling quantitative time or space criteria:
  "Information about the intention I quantifies a state S according to the threshold control of the target T"
Modelling specifies the quantitative criteria by using two fields: Threshold-Type and Exceed-Value (Intention_Information_Threshold_Target1_Threshold-Type_Exceed-Value)

Figure 6:
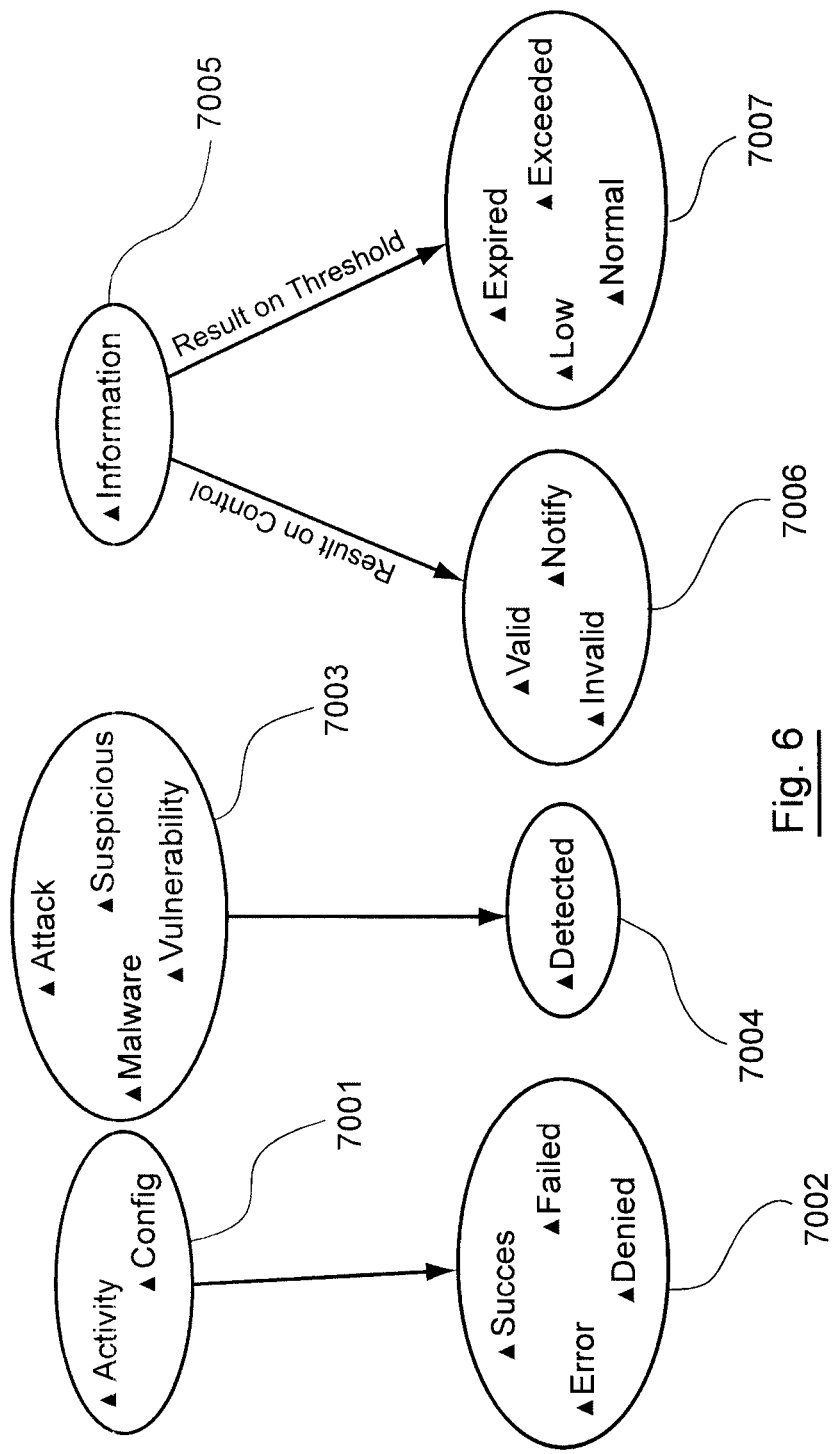
FIG. 6 shows the different possible gain values as a function of the activity types according to the particular inventive embodiment.

FIG. 6 shows the different possible gain values as a function of the activity types according to the particular inventive embodiment.
A distinction can be made between the threshold exceeds below designated by the "INFORMATION" activity (7005 and 7007):
  of at least one time-related threshold (or Expired);
  of at least one threshold unrelated to time (or Exceeded);
  low use of at least one threshold (or Low);
  normal use of at least one threshold (or Normal);
  high use of at least one threshold (or High).
Qualitative
ExaProtect modelling defines the "control" concept for expressing qualitative criteria which model the compliant description of the environment.
  "Information about the intention I qualifies a state S of the control of the target T"
The modelling adopts the qualitative criteria below designated by the "INFORMATION" activity (7005 and 7006): Notify, Valid, Invalid (these states are described below in paragraph 6.2.3.4):
(Intention_Information_Control_Target1_Detail2_Result)
To be more precise a distinction is made between:
AUTHENTICATION_INFORMATION;
RIGHTS_INFORMATION
SYSTEM_INFORMATION;
For example, control information indicating that the operating system method has not been validated for the "authentication" intention corresponding to the message:
  unauthorised authentication method
  can be modelled as:

| Authentication | Information | Control | SysAuth | Method | Invalid | and the threshold information indicating that the authentication service account has expired for the "authentication" intention corresponding to the messages:
  NetScreen: session timeout
  Received certificate expired
  Restricted hours dial-in access
  can be modelled as:

| Authentication | Information | Threshold | SysAuth | Account exceeded |

Vulnerabilities
Messages describing vulnerabilities will be displayed in the form:

(Intention_Vulnerability_Movement_Target1_Detail2_Detected)

Here it is a matter of modelling an IS vulnerability (hereinafter denoted VULNERABILITY activity 4003) obtained by at least one specific information source known as a vulnerability scanner:

To be more precise a distinction is made between:

information about authentication system vulnerability denoted AUTHENTICATION_VULNERABILITY;

information about authorisation system vulnerability denoted RIGHTS_VULNERABILITY;

information about system vulnerability denoted SYSTEM_VULNERABILITY.

In respect of the IS, vulnerability evaluation is straightforward since it is performed by the vulnerability tool: vulnerability exists and has or has not allowed an exploit or it does not exist: the only corresponding state is: "detected or not detected". In this sense vulnerability evaluation is close to attack evaluation and will assume the value "detected" for the "result" field (hereinafter referenced as 7003 and 7004).

Movement According to the Particular Inventive Embodiment

In an IS the movements observed by the information sources are too numerous (unlimited). They are sometimes closely related and may be so similar that they are difficult to detect. One and the same message may comprise a plurality of movements. In the next example where the returned message describes a user log-in failure, two actions are expressed: non-conformity of user name and denial of access.

"a user name is invalid and the authentication request is denied".

In ExaProtect modelling, movement is defined as the means used to fulfil the intention. Movement is related to the "supposed" author of the action, it is aimed at a target and guided by an intention. ExaProtect modelling adapts these definitions to the notion of movement in order to determine the semantic rules for a movement.

Semantic Rule for the "Movement" Concept

The movement which is of concern to the monitoring device in accordance with the particular inventive embodiment concerns movements for securing a gain or failure during operations to access the different components of the IS.

In the example above, it is the denial of access to the IS in accordance with the "AUTHENTICATION" intention which is of concern to the monitoring system and not the reason for the denial.

Rule 4: All movements represent all means employed by an attacker, user, or administrator with the objective or intention 1) of accessing by input/output, 2) of modifying (by adding, deleting, updating) or 3) of making resources available (service start-up, etc.).

Linguistic Rule for Movement

The syntax of the movement concept uses the third field of the Exa model:

(Intention_Activity-Type_Movement_Target1_Detail2_Result)

ExaProtect modelling has adopted movements to access the different IS mechanisms that entail a gain as being relevant movements. Said movements are normal or abnormal and are consolidated according to the rules described below.

Normal Activities of an Agent

The input/output movements of an agent having a normal activity on the IS and for an intention of:

authentication on the IS. Movements inward such as (login) or outward such as disconnection (logout), account locking (locked))

access to an input resource (gain, read)

access to system functions: movements inward (read, gain, receive, connection) or outward (send, forward)

"Availability" movements performed by an agent having a normal activity on the IS and for an intention of;

authentication on the IS, such as the availability of an account via procedures of: (backup, restore, lock, unlock)

access to an IS resource such as the availability of files, directories etc. by operations of (backup, restore, control)

access to system functions such as the availability of services, applications, components or processes: (backup, restore, execute, started up, ended, restarted, stopped, down, control)

Modification movements performed by an agent having a normal configuration activity on the IS and for an intention of:

access to the IS such as account modification (add, delete, modify)

access to a resource such as privileges modification, etc. (add, delete, modify), or such as file adding (write, delete), or access to system functions such as configuration file modification, etc. (write, delete) or addition thereof (add, modify, delete).

Abnormal Activities of an Agent

Input/output movements by an agent having an abnormal activity on the IS and in respect of an intention to access either the IS, a resource or system functions such as movements:

inward (bruteforce, backdoor, bypass, evasion, gain, hijacking, informationleak, informationgathering, phishing, violation, spoofing) etc., outward via attack actions (concealment, steal, informationleak) or malware (spyware, trojan).

Modification movements by an agent having an abnormal activity in respect of an intention to access either the IS, or a resource or system functions such as privileges modification etc, inputs (injection), or malware (spyware)

"Availability" movements performed by an agent having an abnormal activity on the IS and in whatever intention (dos, overflow, spam).

For example, the MOVEMENT to log on to an administrator account of the SSH service was successful in respect of the "access via authentication" intention corresponding to the messages:

SSH Remote root login
User admin login successfully from SSH
can be modelled as:

| Authentication | Activity | Login | SSH | Admin | success |
|---|---|---|---|---|---|

The MOVEMENT to modify the configuration of a group failed in respect of the "modification via authorisation" intention corresponding to the messages:

User cannot be removed from a group
Member could not be added to or removed from the local group
can be modelled as:

| Rights | Config | Modify | OS | AccountGroup | failed |
|--------|--------|--------|-----|--------------|--------|

Gain According to the Particular Inventive Embodiment

Figure 2:
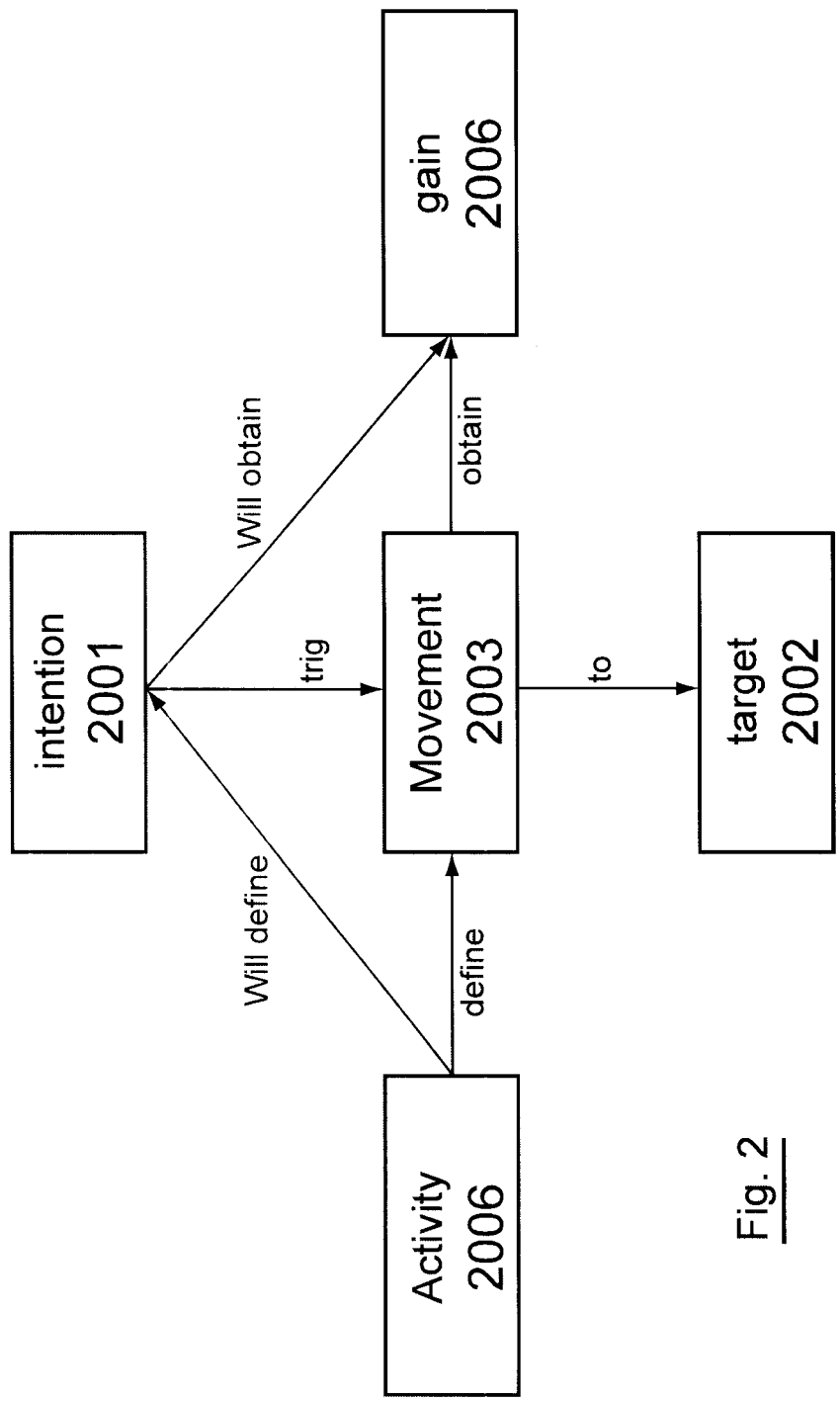
FIG. 2 shows a higher-level view of the ontology based on intention, activity, movement, target and gain classes according to the particular inventive embodiment; it gives the description of an action using the five aforementioned classes: the intention (Intention or Objective) of a type (Activity-Type) directed towards a Target using the movement which finally produces a gain (Result)

FIG. 2 shows that a message expresses the result or gain from an action (or Result 2005) according to the movement 2003, the intention 2001, the target 2002 and the activity type 2006. The success or failure of an action on the IS depends on certain conditions. If these conditions do not comply with the rules managing access to the IS or to the resources of the IS or if the information gathered is not compliant with the environmental information, the action is a failure or in the opposite event, a success.

Semantic Rule for the "Gain" Concept

In the present ontology, the "gain" concept evaluates the progress of the agent according to three main categories:
- the agent (whatever it is): the agent has progressed towards the target through his action: success, if he is an attacker under the terms of the present invention: detected.
- the agent (whatever it is) has not been allowed to progress towards the target because of denial of an access mechanism (authentication, privileges or system function): failed or denied,
- the agent (whatever it is) has not progressed towards the target through his action because of a malfunction of the system he is using in order to complete his action error.

The success or failure of an action also depends on the observer: from the monitoring system point of view, a successful attack is detected whereas for an attacker it represents a successful step in his plan of attack. A normal action may be a gain if progress for the administrator is successful or progress by the user has met his objective. Likewise for users, each user intends to secure a gain in terms of a resource, each movement is completed in this intention. Lastly from the system point of view, successfully maintaining the availability thereof constitutes a success. For example a service start-up constitutes an availability gain for the system, user authentication constitutes an access gain for the user, and attack detection constitutes a "detection" gain for the system.

Rule 5: Progress actions: at each of the steps in the plan, the result is a gain (success or failure) in order to evaluate the progress of the agents towards the specified targets:

Rule 5a: System states: the result expresses a quantitative or qualitative evaluation of the target. A qualitative result expresses conformity whereas a quantitative result expresses a threshold exceed.

Rule 5b: Vulnerabilities: the result is a control performed by a vulnerability scanner the resulting message of which expresses the detection thereof.

Linguistic Rule for the "Gain" Concept

The syntax of the "result" concept uses the last field in the Exa model:

| (Intention_Activity-Type_Movement_Target1_Detail2_Result) |
|---|

A distinction can be made between gains in respect of intentions corresponding to normal, abnormal or state movements.

Normal

These are intentions corresponding to movements related to at least one action that does not affect the configuration of the IS or that does affect the configuration of the IS (reference numbers 7001 and 7002):
- successes (hereinafter denoted Success gains);
- failures (hereinafter denoted Failed gains);
- denials (hereinafter denoted Denied gains);
- errors (hereinafter denoted Error gains);

Abnormal

These are intentions corresponding to movements related to at least one attack or at least one malicious software developed for the purpose of damaging the IS or at least one vulnerability of the IS or at least one suspect action detected by at least one action detection probe of the IS: The gain in said cases is not expressed as a success, since semantically, the success of an attack represents its achievement without it being detected by an information source. As a result, the term "detected" is used (referenced as 7003 and 7004).

States

These are the intentions corresponding to movements that reflect an observed state of the IS the gains whereof are:

1. related to information controlling the actions of the targets in respect of intentions corresponding to at least one movement reflecting at least one action of at least one target of the IS which comprise:
   - valid states subsequent to at least one control (hereinafter referred to as Valid);
   - invalid states subsequent to at least one control (hereinafter referred to as Invalid):
   - notifications as to at least one target subsequent to at least one control (hereinafter referred to as Notify).

2. related to information controlling the use of thresholds in respect of targets for intentions corresponding to at least one movement reflecting at least one use of at least one threshold on at least one target of the IS which comprise:
   - exceeding at least one time threshold (hereinafter referred to as Expired):
   - exceeding at least one threshold unrelated to time (hereinafter referred to as Exceeded);
   - low usage of at least one threshold (hereinafter referred to as Low), the thresholds may be a limit in respect of rights, or may express a lack of user privilege;
   - normal usage of at least one threshold (hereinafter referred to as Normal);
   - high usage of at least one threshold (hereinafter referred to as High).

Target According to the Particular Inventive Embodiment

All system resources represent a target. Targets are logic entities, representing assets of the IS—user, data, process, protocol—or physical entities components, equipment, interconnections etc.

Semantic Rule for the "Target" Concept

The distinctive feature of a monitoring system is that it evaluates all dangerous actions potentially generated in respect of the target in the event of their objective being achieved: the target is therefore at the core of the action. Target recognition is thus close to the risk models where all target values vary according to the intention conveyed by the standardised event. Furthermore, real actions observed by the monitoring system are the result of interactions between IS players and assets.

This is why our modelling of targets will depend on one or other of the 4 "intention" components. Monitoring puts the agent and the asset into interaction, which will be often expressed by the (player, asset) pair denoted (Target Type, Target Detail).

Linguistic Rule for the "Target" Concept

1. Where an Authentication intention is involved, the Target Type and Target Detail elements of the (Target Type, Target Detail) pair relate respectively to the authentication mechanism and the authenticated entity representing the account logging into the IS.

2. Where a Rights intention is involved, the (Target Type, Target Detail) pair relates respectively to the resource owner and the resource the rights to which have been used to access it.

3. Where a System or Information Gathering intention is involved, the pair relates respectively to the system component and attribute thereof such as for example the two physical components (Host, CPU) where CPU is a host attribute or two logic components (WEB, URL) where URL is the Web attribute.

CONCLUSION

The ontology concepts have been retrieved through action theory. However, to validate them, a conventional approach founded on expert knowledge was used for comparison with the first action theory results. The standards "ISO/IEC 15408 Information Technology—Security Techniques"—"Evaluation criteria for ID security" and the "Common Criteria" were therefore used to consolidate the modelling.

The ontology according to the particular inventive embodiment has been verified on a corpus of 20182 messages from heterogeneous information sources. The number of messages intended for the analyst can thus be reduced from 20182 to 1734 (targets included).

This ontology can be applied in a context of networked intrusion detection since it allows interoperability between the different information sources and automatic processing of message semantics by automatic programs. Intrusion detection is therefore efficient in the case of networking between information sources for the monitoring of intentions and movements.

Modelling Example

Figure 7:
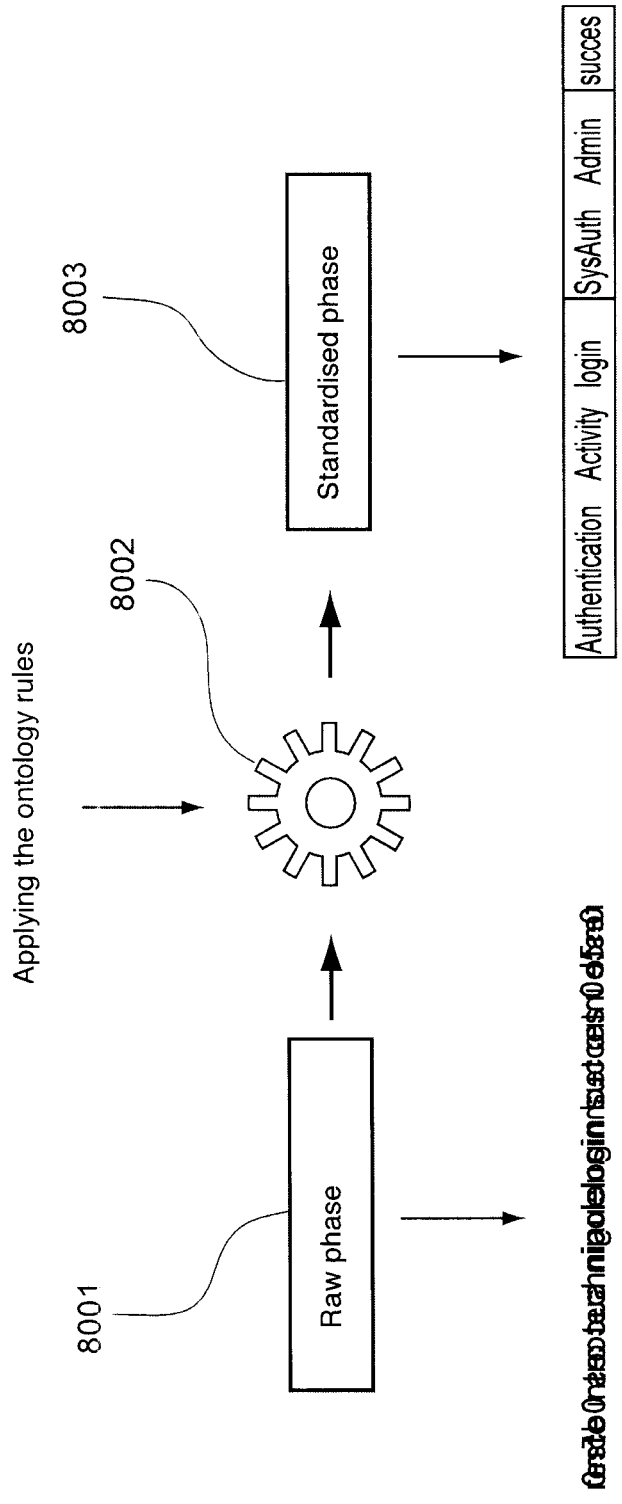
FIG. 7 shows the conversion of a message comprising a phrase in natural language sent by a detection probe into a reference event category.
Figure 9:
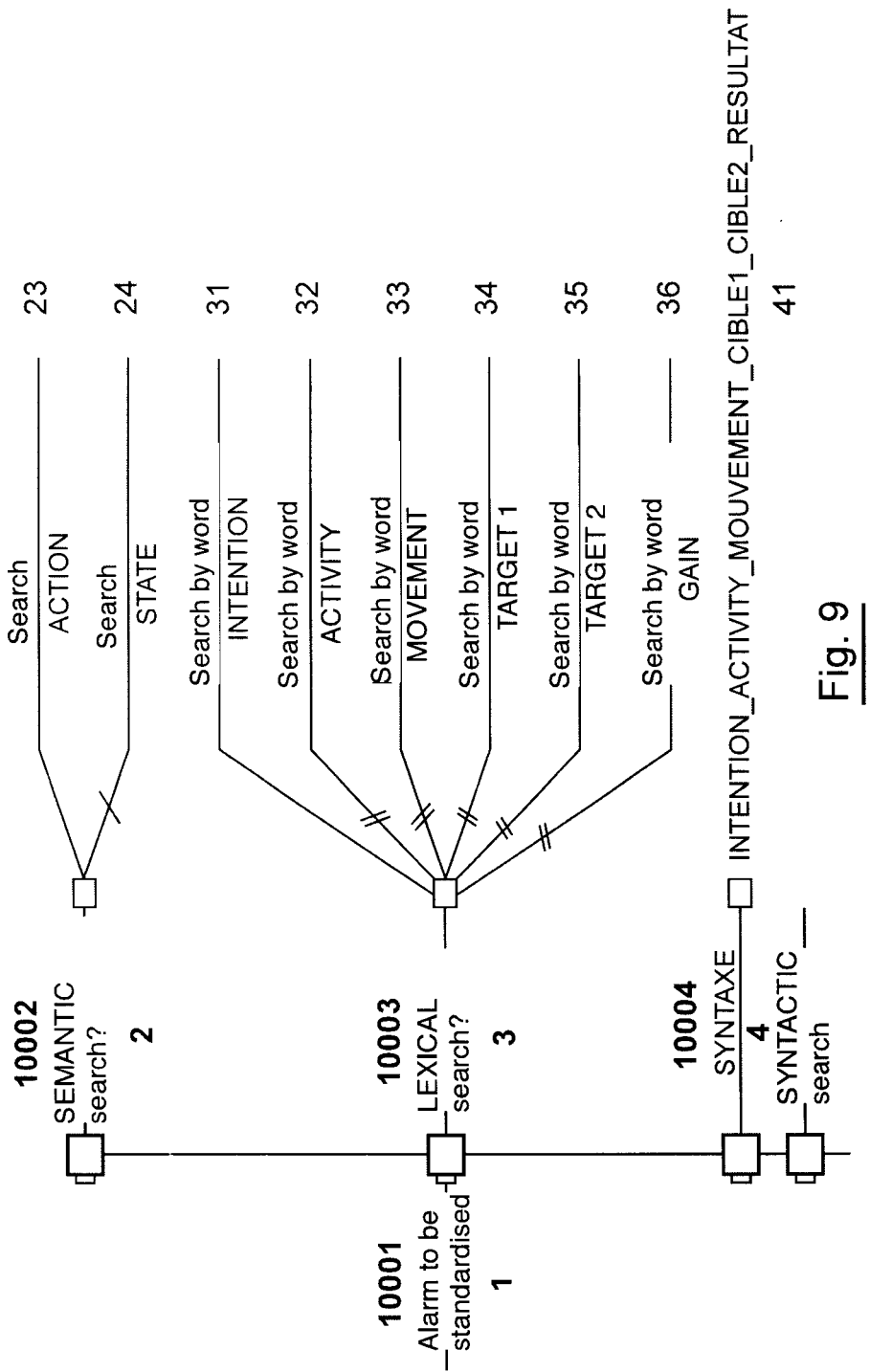
FIG. 9 shows all available methods, lexical, semantic and syntactic for disassembling a message into a disassembled message according to the particular inventive embodiment.

Here are some examples of generic formulation proposed by standardisation:

A denial of service has been detected in respect of an authentication attack
    AUTHENTICATION_ATTACK_DOS_SERVICE_DETECTED An authentication service user login has been successful in respect of an authentication activity
    AUTHENTICATION_ACTIVITY_LOGIN_SERVICE_USER_SUCCESS An authentication service user account add-on has been successful in respect of an authentication configuration activity
    AUTHENTICATION_CONFIG_ADD_SERVICE_USER_SUCCESS Protocol packets have been successfully received for a system activity
    SYSTEM_ACTIVITY_RECEIVE_PROTOCOL_PACKET_SUCCESS A receipt of protocol packets has been denied in respect of a system activity
    SYSTEM_ACTIVITY_RECEIVE_PROTOCOL_PACKET_DENIED An http service code injection has been detected in respect of a system attack
    SYSTEM_ATTACK_CODEINJECTION_SERVICE_DETECTED Conversion According to the Particular Inventive Embodiment A description is now given of the conversion, including the aforementioned steps for disassembling, comparing and generating (as shown in FIGS. 7 and 9), by conversion means 8002, of a message 8001 comprising a phrase in pseudo-natural language (commonly known as a message, a raw event or a raw log) sent by any information source (or detection probe) into a standardised event by comparison with a reference event category 8003 (which is a standardised phrase). It is additionally important for the conversion process to respect and retain the initial meaning of the message (or raw event) in other words the action it is modelling.

The disassembly step, which is based on the aforementioned modelling, according to the particular inventive embodiment, makes it possible, as we have seen, to obtain first, second, third, fourth, fifth, sixth and seventh disassembled messages (such as those shown in the tables in FIG. 5A or 5B) from these first, second, third, fourth, fifth, sixth and seventh messages.

a) first message collected in the SYSLOG audit log of an information source in a Solaris operating system:
    SU: command success b) second message collected in the audit log of an information source in an AIX operating system:
    Rshd: Root login success c) third message collected in the audit log of an information source of the network equipment type (switch, router, etc):
    Admin: login d) fourth, fifth, sixth and seventh messages collected in the audit log of an information source of the security equipment type (firewall, IDS, etc):
    User admin login successfully from GUI
    Root login
    Admin Connection
    SMB: Administrator Logon Success 0x 40705a00.

The task of the security expert comprises disassembling (this being part of the conversion process) a message (or raw log) in order to obtain a disassembled message characterised by the different components (INTENTION, MOVEMENT, TARGET TYPE, TARGET DETAIL and GAIN). The expert obtains the following values for the components:
    INTENTION=Authentication;
    MOVEMENT=Authentication Activity Login;
    TARGET TYPE=choice from the list of authentication services defined in respect of Authentication Activity Login
    TARGET DETAIL=choice from the list of users defined in respect of Authentication Activity Login;
    GAIN=choice from the result list: failed/success.

The security expert uses a conversion tool in order to make a raw message correspond to a disassembled message. Semantic disassembly means that the aforementioned model rules can be applied, syntactic disassembly applies the generic ExaProtect model and lexical disassembly the corresponding terms in the ExaProtect lexis.

The conversion process then comprises a step of comparing the first, second, third, fourth, fifth, sixth and last disassembled messages with reference event categories subsequent to which first, second, third and fourth standardised events are generated.

The Disassembly Step According to the Particular Inventive Embodiment

The security expert searches for the semantic or/and syntactic or/and lexical values of the 5 concepts in a message. The pattern 11000 describes the procedure adopted by the security expert in the objective of disassembling the message (to be disassembled) 11001. The expert works as he chooses on one of the 3 recognition processes, this reasoning being assisted by a linguistic tool in order to facilitate all or part of the search.

The study hereinafter determines that movement recognition is critical: movement is a high-order concept.

Movement, a High-Order Concept

The table below shows that the "movement" concept is a high-order concept since knowledge thereof allows the expert to deduce (implicit) the other concepts. In the context of the conversion according to the particular inventive embodiment, TO DETECT A MOVEMENT is TO CONVERT. In the opposite event, the procedure adopted by the expert will be to detect one of the other concepts by following the previous semantic questioning shown in detail in the figure (11002).

The table below shows five instances of messages for which the expert has successively knowledge of the value of some components (Movement, Intention, Target Type, Target Detail and Gain) and for which it is possible to achieve a disassembly according to the particular inventive embodiment or not.

For the first message (corresponding to the first line), the expert immediately detects the movement, and then the Target Detail, and then the gain. Intention and Target Type recognition is implicit, which means that the corresponding message can be disassembled.

For the second, third, and fourth messages (corresponding to the second, third and fourth lines respectively), the expert does not detect the movement, which means he cannot disassemble said messages. For the fifth message (corresponding to the fifth line, the expert detects a plurality of values in the aforementioned components, these ambiguities not allowing the corresponding message to be disassembled.

If the expert recognises the movement and/or the intention
    If the expert recognises a target?
    If the expert recognises a gain?
    Is conversion possible?

|   | Movement | Intention | Type | Detail | Gain | CONVERSION |
|---|---|---|---|---|---|---|
| 1 | Yes | Implicit | Implicit | Yes | Yes | Yes |
| 2 | No | Several | Several | Several | Yes | No |
| 3 | No | No | Yes | Yes | Yes | Target-dependent |
| 4 | No | Several | Yes | Several | Yes | No |
| 5 | Several | Several | Several | Several | Yes | No |

Through the rules and by modelling according to the particular inventive embodiment, the expert is guided to detect the other components (Intention, Activity Type, Movement, Target Type, Target Detail and Gain) present in the message he is reading and as far as possible to identify the reference event category corresponding thereto where appropriate.

Target Pairs, High-Order Concepts

For some messages, knowledge of the target implicitly gives the value of the intention. This is logical since some targets are only compatible with some intentions. We may cite the following instances:

The "user account" target is related to (since solely in contact with) the "authentication" intention: this can be explained since from the technical point of view the authentication mechanism related to the "authentication" intention always requires a user account to operate.

The "group" target is related to the "rights" intention, this being explained since from the technical point of view authorisation mechanisms are the only mechanisms to handle user groups.

The "memory" target is related to the "system" this being explained since from the technical point of view system mechanisms are the only ones to handle the physical components of the IS.

Processing Low-Order Concepts

In the conversion process according to the particular inventive embodiment obtaining the MOVEMENT is not always possible or accurate, and the expert must then use other "input points" to retrieve the message semantics. For example, in the case of a problem in identifying the MOVEMENT, he may retrieve the intention, target or gain.

For example, out of 12 messages including the "anonymous" target, 100% include the "authentication" intention, out of 28 messages including the "memory" target, 100% include the "system" intention (and correspond either to information or to attacks), out of 40 messages including the "group" target, 100% include the "rights" intention, out of 135 messages including the "user" target, 77% include the "authentication" intention.

We can make a distinction between:
    targets which will allow the intention, activity type or movement to be defined;
    targets which allow a plurality of choices;
    targets devoid of any semantics in respect of intention or movement.

Application of Semantic, Syntactic and Linguistic Rules for Disassembling a Message According to the Particular Inventive Embodiment The reasoning below is initialised by a message disassembly request. Each of the disassembly steps may be undertaken independently of the order of execution of each one. The expert will undertake a semantic search (referenced 10002 in FIG. 9) or a lexical search (referenced 10003) or a syntactic search (referenced 10004).

1. The expert recognises the 5 concepts: intention activity movement target
    1a. He identifies via the lexical search the terms corresponding to one of the 5 CONCEPTS
    1b. He applies the general syntax of the Exa model
2. The expert recognises only one high-order concept
    2a. He deduces the other concepts
    2b. he takes the steps based on 1.a
3. The expert recognises at least one of the 4 concepts: intention, activity, target, result.
    3a. He possesses no high-order concept
    3b. He uses the lexical search to help him detect one of the five concepts
    3c. He detects a high-order concept
    3d. He takes the steps based on 2 and then 1.
4. The expert recognises none of the 5 concepts: intention, activity, movement, target, result.
    4a. He possesses no high-order concept
    4b. He cannot use the lexical search to help him detect one of the five concepts
    4c. He defines whether the message is a step or a state or a vulnerability
    4d. He detects the step concept
    4d.i) He disassembles the raw message according to the syntactic form (the generic phrase adapted to the step message)
    4d.ii) He detects according to the position of the term in the phrase the associated concept now become a high-order concept
    4d.iii) He detects for example a high-order "movement" concept
    4d.iv) He defines the semantics through the semantic rules:
    4d.iv-(1) is it a movement to access the IS, 4d.iv-(2) is a modification movement, etc?

4d.iv-(3) is it a movement to access the vital functions of the IS?

4d.iv-(4) is it an authentication or rights or system intention?

4d.iv-(5) he takes the steps based on 1.a 4d.v) He detects for example an "intention" concept 4d.vi) He defines the semantics through the semantic rules, is it an access intention:

4d.vi(1) via an authentication mechanism?

4d.vi(2) via a privilege mechanism?

4d.vi(3) via a system mechanism?

4d.vi(4) He takes the steps for the other concepts based on 2 and then 3 and then 4 and 1.a 4d.vii) He detects for example an "activity" concept 4d.viii) He defines the semantics through the semantic rules, is it a normal or abnormal or suspicious action:

4d.viii(1) He detects an abnormal or suspicious activity 4d.viii(2) He defines the semantics of the attack or malware or of the suspicion by returning to step 1.a 4d.viii(3) is it an authentication or rights or system intention?

4d.viii(4) He takes the steps for the target concepts based on 4 and then 1.a

4e. He detects a state activity concept 4e.i) He disassembles the raw message according to the syntactic form (the generic phrase appropriate to the state message)

4e.ii) He defines the semantics of the state activity:

4e.ii(1) Is it a qualitative datum?

4e.ii-1-(a) is it an authentication or rights or system intention?

4e.ii-1-(b) He takes the steps based on 1.a 4e.ii-1-(c) He takes the steps for the target concepts based on 4 and then 1.a 4e.ii(2) Is it a quantitative datum?

4e.ii-2-(a) is it an authentication or rights or system intention?

4e.ii-2-(b) He takes the steps based on 1.a 4e.ii-2-(c) He takes the steps for the target concepts based on 4 and then 1.a 4-f He detects a vulnerability activity concept 4f.i) He disassembles the raw message according to the syntactic form (the generic phrase appropriate to the vulnerability message)

4f.ii) He defines the vulnerability semantics:

4f.ii-(1) Is it an authentication or rights or system intention vulnerability?

4f.ii-(2) He takes the steps for the target concepts based on 4 and then 1.a 4.g He takes the steps based on 1.a 5. The expert recognises only one or more of the 5 concepts: intention, activity, movement, target, result.

5a. He possesses no high-order concept

5b. He cannot use the lexical search to help him detect one of the five concepts 5c. He cannot define whether the message is a step or a state or a vulnerability 5d. He cannot disassemble the raw message according to the syntactic form (the generic phrase appropriate to the state or step message)

5e. He cannot associate a concept with the position of the term in the phrase

Figure 8:
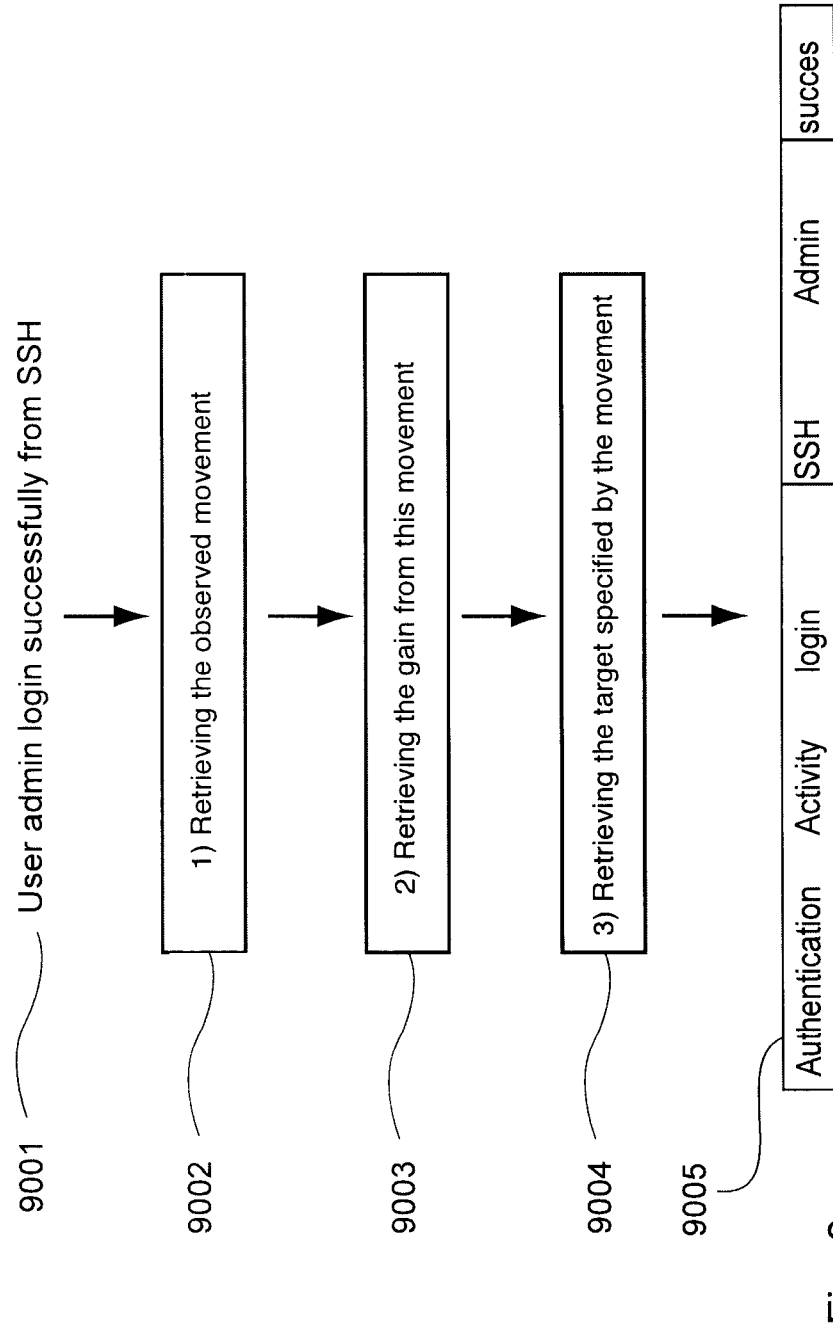
FIG. 8 shows an algorithm expressing one of the methods for explicitly disassembling a message into a disassembled message in accordance with a first example according to the particular inventive embodiment.

5f. He explores the expert knowledge databases to determine one of the 5 concepts 5g. He takes the steps for each concept based on 2, 3, 4, 5 for the other concepts and then 1.a 6. The expert cannot standardise the message Disassembling a Message from the "Movement" Concept In relation to FIG. 8 the main steps have been shown in an algorithm for the explicit disassembly (or semantics retrieval) of a message 9001 into a disassembled message 9005 according to a first example in accordance with the particular embodiment of the invention.

The message 9001 is "User admin login successfully from SSH"

For example, in a first step 9002, the security expert retrieves the MOVEMENT expressed by this message. For example, the message 9001 unambiguously allows a login MOVEMENT to be modelled. Likewise, it is easy, in a second step 9003 to retrieve the gain ("success") and, in a third step 9004, the "admin" and "SSH" targets of this message 9001. Retrieving the meaning of the message 9001 thus allows the message 9001: "User admin login successfully from SSH" to be disassembled into the disassembled message 9005, which takes a following form:

| Authentication | Activity | Login | SSH | Admin | success |
| --- | --- | --- | --- | --- | --- |

The Comparison and Generation Step According to the Particular Inventive Embodiment Once the reference event categories have been built, in the aforementioned definition step, 1746 such categories have for example been built, from the inventive ontology or "workflows" (by defining a set of intention, movement, activity, target and gain values in respect of each of them), by the inventors of the present invention.

A message (for raw event), once disassembled into a disassembled message by the conversion process according to the present particular inventive embodiment, may thus:

correspond to one (of the 1746) given reference event category, and then preferentially, a verification is made that the given reference event category is not already present in a first database (first storage means) and in the event of a positive verification, this given category is stored in the first database;

does not correspond to any reference event category (of the 1746 categories), and then preferentially, the disassembled message is stored in a second database (second storage means).

Knowledge Interpretation and Representation According to the Particular Inventive Embodiment The security analyst must first of all understand the messages, and then, he has to acquire the knowledge which will enable him to create processing rules (standardisation, aggregation, correlation). There are thus two aspects to the work of the security analyst namely message analysis and the creation of standardisation, aggregation or correlation scenarios.

Graphical Representation of Standardisation

Figure 10:
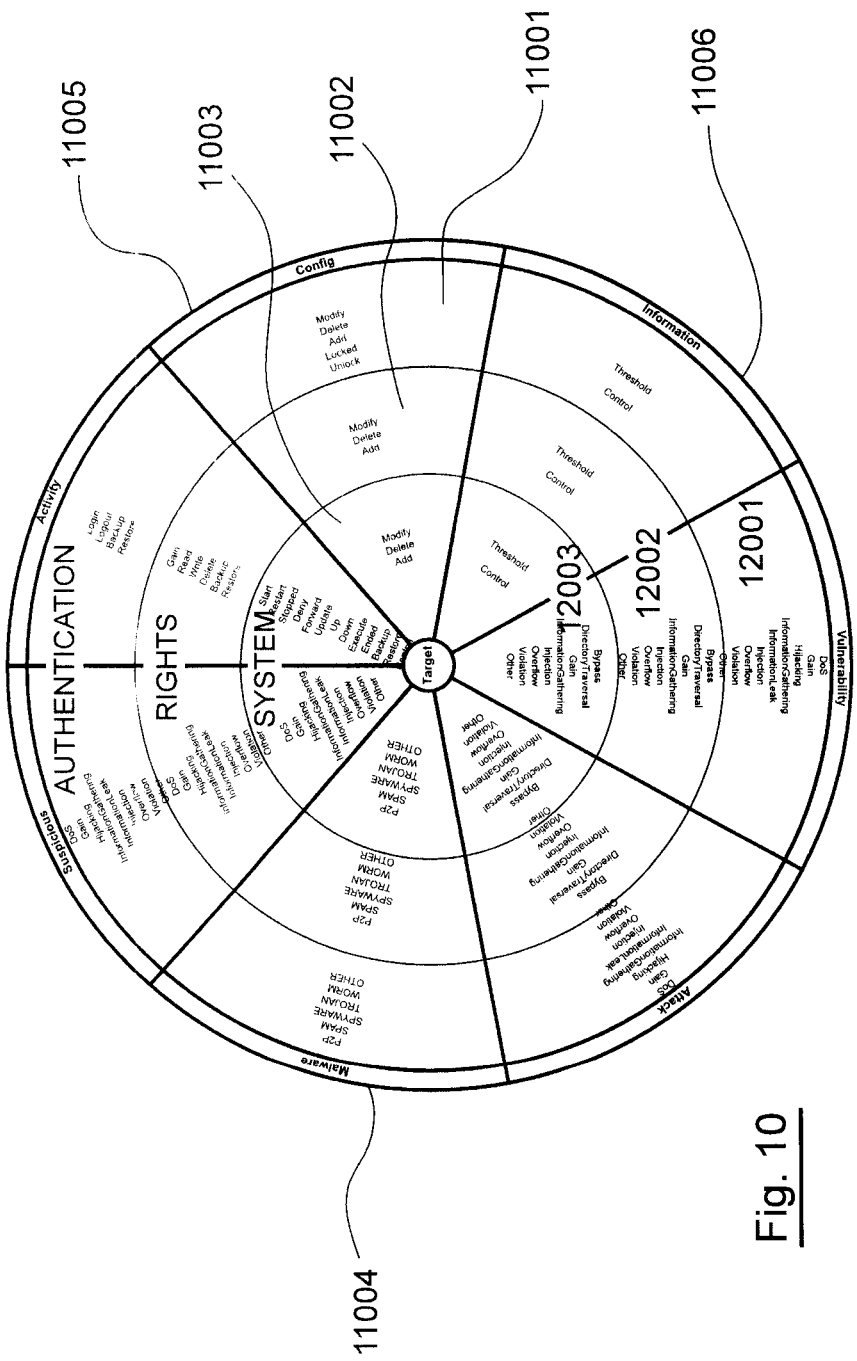
FIG. 10 shows one of the methods for the particular graphical presentation of all standardised events categories in ExaProtect standardisation in the form of a graphics chart according to the particular inventive embodiment.

To provide a synthetic view of the modelled actions we have presented the 5 concepts and instances thereof in the form of a chart (shown in FIG. 10) thereby describing the different possible action combinations. To express the notion of progress (the profile steps) we have constructed the chart in three concentric areas so that the actions furthest away from the target such as "AUTHENTICATION" (referenced as 11001) are in a light green area, actions to access the vital functions of the "SYSTEM" IS (referenced as 11003), are in a light red area, and actions to access "RIGHTS" resources (referenced as 11002) are in an orange area. The activity type is expressed by graphic portions: "dark green" represents normal activities (referenced as 11005), "dark red" is for anomalies (referenced as 11004) and "transparent parts" represent state information or vulnerabilities (referenced as 11006).

Graphical Representation of the Standardised Event Generation Phase

Standardised events are shown in tabular form and characterised by the date, name, source and destination and raw message the name of which contains the structure of the reference event category.

KEY TO THE FIGURES

FIG. 1

| | |
|---|---|
| 1001 | Client stations |
| 1002 | Printing Server |
| 1003a | File Server |
| 1005 | Router |
| 1009 | Database |
| 1010 | Server |

FIG. 7

| | |
|---|---|
| Appplication des règles de l'ontologie | Applying the ontology rules |
| 8001 | Raw phase |
| 8003 | Standardised phase |

FIG. 8

| | |
|---|---|
| 9002 1) | Retrieving the observed movement |
| 9003 2) | Retrieving the gain from this movement |
| 90004 3) | Retrieving the target specified by the movement |

FIG. 9

| | |
|---|---|
| 10001 | Alarm to be standardised |
| 10002 | SEMANTIC search |
| 10003 | LEXICAL search |
| 10004 | SYNTACTIC search |
| Recherche par mot | Search by word |
| CIBLE | TARGET |

The invention claimed is:

1. A method executed by a computer, the method comprising:
defining a plurality of reference event categories each associated with at least one reference action from an ontology based on:
an intention class representing a purpose of each reference action,
an activity type class representing a nature of each reference action,
a movement class representing an implementation of each reference action,
a target class representing an object of each reference action, and
a gain class representing result of each reference action, wherein the ontology is operable to define each action by meaning of an event such that, based on linguistic rules associated with each reference action, the action belongs to no more than one reference event category; and for each given message,
disassembling the given message in a database defined by the intention class, the activity type class, the movement class, the target class and the gain class;
comparing the disassembled message with at least one reference event category; and
generating at least one standardised event representing a correspondence between the disassembled message and the reference event category, wherein:
each of the linguistic rules corresponds to a type of reference action that is represented in different fields of messages when the messages are generated from different log-generating systems;
each of the linguistic rules associates the type of reference action with a predicted result of the reference action;
the meaning of the event is defined based at least in part on the type of reference action and the predicted result; and
the standardised event is operable to represent the given message by meaning regardless of differences in arrangements of fields between the message and other messages having the same meaning.

2. The method of claim 1, comprising, when the disassembled message corresponds to a reference event category:
verifying that the reference event category is not already present in a first storage device; and
upon a positive verification, storing the reference event category in the first storage device.

3. The method of claim 2, comprising storing the message in a second storage device.

4. The method of claim 1, wherein defining the plurality of reference event categories comprises defining each reference category based on at least one of a syntactic rule, a lexical rule, or a semantic rule.

5. The method of claim 1, comprising:
counting a number of disassembled messages corresponding to each reference event category.

6. The method of claim 1, wherein the intention class comprises at least one of:
an intention of discovering at least one datum on at least one target of an information system;
an intention of collecting at least one datum on at least one target of an information system;
an intention of accessing an information system using at least one authentication procedure that employs at least one identification datum;
an intention of accessing at least one resource of an information system using at least one rights-requiring procedure; or
an intention of accessing an availability setting of at least one resource of an information system.

7. The method of claim 1, wherein the movement class comprises at least one of:
a movement related to at least one action that does not affect a configuration of an information system;
a movement related to at least one action that does affect a configuration of an information system;
a movement related to at least one attack;
a movement related to at least one malicious software item operable to harm an information system;

a movement related to at least one suspect action detected by at least one action detector probe of an information system;

a movement related to at least one vulnerability of an information system; or a movement reflecting an observed state of an information system.

8. The method of claim 7, wherein the gain class comprises at least one of:

corresponding to the movement related to the at least one action that does affect the configuration of the information system or the movement related to the at least one action that does not affect the configuration of the information system: a success, a failure, a denial, or an error;

corresponding to the movement related to at least one attack, the movement related to the at least one malicious software item, the movement related to at least one vulnerability, or the movement related to at least one suspect action: a detection; or corresponding to the movement reflecting the observed state of the IS:

a gain from intentions corresponding to at least one movement reflecting at least one action of at least one target of the information system; or a gain from intentions corresponding to at least one movement reflecting at least one use of at least one threshold with respect to at least one target of the information system.

9. The method of claim 8, wherein the gain from intentions corresponding to movements reflecting actions of targets of the information system comprises:

a valid state subsequent to at least one control;

an invalid state subsequent to at least one control;

a notification about at least one target subsequent to at least one control.

10. The method of claim 8, wherein the gain from intentions corresponding to movements reflecting the at least one use of at least one threshold comprises at least one of:

exceeding at least one time threshold;

exceeding at least one threshold unrelated to time;

low usage of at least one threshold;

normal usage of at least one threshold; or high usage of at least one threshold.

11. A computer program product configured to cause a computer to perform operations comprising:

defining a plurality of reference event categories each associated with at least one reference action from an ontology based on:

an intention class representing a purpose of each reference action, an activity type class representing a nature of each reference action, a movement class representing an implementation of each reference action, a target class representing an object of each reference action, and a gain class representing result of each reference action, wherein the ontology is operable to define each action by meaning of an event such that, based on linguistic rules associated with each reference action, the action belongs to no more than one reference event category; and for each given message, disassembling the given message in a database defined by the intention class, the activity type class, the movement class, the target class and the gain class;

comparing the disassembled message with at least one reference event category; and generating at least one standardised event representing a correspondence between the disassembled message and the reference event category, wherein:

each of the linguistic rules corresponds to a type of reference action that is represented in different fields of messages when the messages are generated from different log-generating systems;

each of the linguistic rules associates the type of reference action with a predicted result of the reference action;

the meaning of the event is defined based at least in part on the type of reference action and the predicted result; and the standardised event is operable to represent the given message by meaning regardless of differences in arrangements of fields between the message and other messages having the same meaning.

12. The computer program product of claim 11, the operations comprising, when the disassembled message corresponds to a reference event category:

verifying that the reference event category is not already present in a first storage device; and upon a positive verification, storing the reference event category in the first storage device.

13. The computer program product of claim 12, the operations comprising storing the message in a second storage device.

14. The computer program product of claim 11, wherein defining the plurality of reference event categories comprises defining each reference category based on at least one of a syntactic rule, a lexical rule, or a semantic rule.

15. The computer program product of claim 11, the operations comprising:

counting a number of disassembled messages corresponding to each reference event category.

16. A system comprising:

a computer configured to perform operations comprising:

defining a plurality of reference event categories each associated with at least one reference action from an ontology based on:

an intention class representing a purpose of each reference action, an activity type class representing a nature of each reference action, a movement class representing an implementation of each reference action, a target class representing an object of each reference action, and a gain class representing result of each reference action, wherein the ontology is operable to define each action by meaning of an event such that, based on linguistic rules associated with each reference action, the action belongs to no more than one reference event category; and for each given message, disassembling the given message in a database defined by the intention class, the activity type class, the movement class, the target class and the gain class;

comparing the disassembled message with at least one reference event category; and generating at least one standardised event representing a correspondence between the disassembled message and the reference event category, wherein:

each of the linguistic rules corresponds to a type of reference action that is represented in different fields of messages when the messages are generated from different log-generating systems;

each of the linguistic rules associates the type of reference action with a predicted result of the reference action;

the meaning of the event is defined based at least in part on the type of reference action and the predicted result; and the standardised event is operable to represent the given message by meaning regardless of differences in arrangements of fields between the message and other messages having the same meaning.

17. The system of claim 16, the operations comprising, when the disassembled message corresponds to a reference event category:

verifying that the reference event category is not already present in a first storage device; and upon a positive verification, storing the reference event category in the first storage device.

18. The system of claim 17, the operations comprising storing the message in a second storage device.

19. The system of claim 16, wherein defining the plurality of reference event categories comprises defining each reference category based on at least one of a syntactic rule, a lexical rule, or a semantic rule.

* * * * *